US010248156B2

(12) United States Patent
Yuyama et al.

(10) Patent No.: US 10,248,156 B2
(45) Date of Patent: Apr. 2, 2019

(54) DATA PROCESSING DEVICE

(71) Applicant: Renesas Electronics Corporation, Tokyo (JP)

(72) Inventors: Yoichi Yuyama, Tokyo (JP); Kiwamu Takada, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 221 days.

(21) Appl. No.: 15/502,771

(22) PCT Filed: Mar. 20, 2015

(86) PCT No.: PCT/JP2015/058462
§ 371 (c)(1),
(2) Date: Feb. 8, 2017

(87) PCT Pub. No.: WO2016/151674
PCT Pub. Date: Sep. 29, 2016

(65) Prior Publication Data
US 2017/0227981 A1 Aug. 10, 2017

(51) Int. Cl.
*G06F 1/06* (2006.01)
*G06F 11/16* (2006.01)
(Continued)

(52) U.S. Cl.
CPC ............ *G06F 1/06* (2013.01); *G06F 11/1608* (2013.01); *G06F 11/1625* (2013.01);
(Continued)

(58) Field of Classification Search
CPC ..... G06F 1/12; G06F 1/14; G06F 1/10; G06F 5/06; G06F 13/1689; G06F 1/08;
(Continued)

(56) References Cited

U.S. PATENT DOCUMENTS 5,113,522 A * 5/1992 Dinwiddie, Jr. ..... G06F 11/1641
713/2
5,359,727 A * 10/1994 Kurita ..................... G06F 1/10
331/10

(Continued)

FOREIGN PATENT DOCUMENTS

JP   H 09-134336 A   5/1997
JP   2004-280732 A   10/2004
(Continued)

OTHER PUBLICATIONS

International Search Report (ISR) (PCT Form PCT/ISA/210), in PCT/JP2015/058462, dated Jun. 2, 2015.

*Primary Examiner* — Zahid Choudhury
(74) *Attorney, Agent, or Firm* — McGinn IP Law Group, PLLC.

(57) ABSTRACT

In a data processing device including two sets of circuit pairs which are respectively duplicated in two clock domains which are asynchronous to each other, an asynchronous transfer circuit that transfers a payload signal is provided between the two sets of circuit pairs. The asynchronous transfer circuit includes two sets of a pair of bridge circuits which are respectively connected to the two sets of circuit pairs, and asynchronously transfers the payload signal and a control signal indicating a timing at which the payload signal is stable on a reception side. The two sets of a pair of bridge circuits and the payload signals can be duplicated, but the control signal is not duplicated, and the received payload signal is used for timing control to supply an expected same time difference, to the pair of duplicated circuits. This enables asynchronous transfer between circuits duplicated in the asynchronous clock domains.

20 Claims, 14 Drawing Sheets

(51) Int. Cl.
*G06F 13/42* (2006.01)
*H04L 12/54* (2013.01)
*H04L 12/70* (2013.01)

(52) U.S. Cl.
CPC ...... *G06F 11/1641* (2013.01); *G06F 11/1675* (2013.01); *G06F 11/1695* (2013.01); *G06F 13/4213* (2013.01); *G06F 13/4226* (2013.01); *G06F 13/4239* (2013.01); *H04L 12/5601* (2013.01); *H04L 2012/566* (2013.01)

(58) Field of Classification Search
CPC ........ G06F 1/04; G06F 1/3202; G06F 9/4825; G06F 11/0757; G06F 11/3419; G11C 7/22
See application file for complete search history.

(56) References Cited

U.S. PATENT DOCUMENTS

| | | | |
|---|---|---|---|
| 5,754,833 A * | 5/1998 | Singh | G06F 13/405 713/400 |
| 6,157,967 A | 12/2000 | Horst et al. | |
| 2003/0226052 A1 * | 12/2003 | Hill | G06F 1/12 713/400 |
| 2004/0208130 A1 | 10/2004 | Mizutani et al. | |
| 2004/0225909 A1 * | 11/2004 | Adkisson | G06F 1/12 713/400 |
| 2004/0233865 A1 * | 11/2004 | Adkisson | G06F 1/12 370/324 |
| 2006/0023820 A1 * | 2/2006 | Adkisson | H04L 7/02 375/354 |
| 2006/0164902 A1 * | 7/2006 | Fung | G06F 5/06 365/221 |
| 2009/0031115 A1 | 1/2009 | Pruiett et al. | |
| 2009/0259874 A1 * | 10/2009 | Owen | G01R 31/31726 713/500 |
| 2010/0082875 A1 | 4/2010 | Sato | |
| 2012/0066545 A1 | 3/2012 | Abe | |

FOREIGN PATENT DOCUMENTS

| | | |
|---|---|---|
| JP | 2004-326151 A | 11/2004 |
| JP | 2010-079702 A | 4/2010 |
| JP | 2010-534888 A | 11/2010 |
| JP | 2012-063828 A | 3/2012 |

* cited by examiner

DATA PROCESSING DEVICE

TECHNICAL FIELD

The present invention relates to a technique which is beneficial to the application of a data processing device including logic circuits which are duplicated for functional safety, and an asynchronous data transfer circuit which is provided between the logic circuits and different logic circuits which operate asynchronously to the logic circuits.

BACKGROUND ART

For an increase in frequency, it is likely that a logic circuit operating at a high-frequency clock, such as a central processing unit (CPU) core, operates at an operation clock that is asynchronous to those of different logic circuits. CPU clocks and bus clocks are asynchronous to each other by inserting an asynchronous bus bridge at the interface between a CPU and an on-chip bus, and thus the operation frequency of the CPU is accelerated.

In addition, with respect to some circuits in the field of in-vehicle devices for which high reliability is needed, since the circuits are redundant by being duplicated by Dual-Core Lock-Step (DCLS), it is possible to secure safety by using a system configuration in which failure is detected during a system operation and the system is safely stopped. If a circuit of a CPU or the like is duplicated by using, for example, a DCLS configuration, the output signals of the duplicated CPUs are compared sequentially. Therefore, in a case where a temporary or permanent failure occurs on one CPU, it is possible to promptly detect the occurrence of abnormality. However, only abnormality is detected in the comparison by duplicated ones, and processes such as backup or recovery are performed separately. The safety needed in the in-vehicle devices is standardized by using an automotive safety integrity level (ASIL) or the like, and a duplication technique of a CPU or the like is used for satisfying the safety.

DISCLOSURE OF THE INVENTION

Problems that the Invention is to Solve

The inventors of the present invention have found new following problems from studying the data processing device capable of achieving high performance and high reliability.

Two circuits which are duplicated at the same time perform the same data processing in parallel, the outputs which are expected to be the same processing result and are output at the same time are compared to each other, and in a case of mismatch, abnormality is detected in which at least one circuit fails. Two circuits which are duplicated are operating synchronously in the same clock domain, and "at the same time" means the same clock cycle. Here, in duplication, "at the same time" is not necessarily required, and a predetermined time difference (difference in the number of cycles) may be maintained. However, to simplify the description here, a description will be given assuming that two circuits which are duplicated perform the same data processing in parallel at the same time.

A case is considered in which asynchronous transfer of data is performed by simply providing two sets of an asynchronous transfer circuit between two sets of a pair of circuits which are respectively duplicated in two clock domains which are asynchronous to each other. If there is no failure, two pieces of same data are transmitted at the same time in synchronization with the send-side clock, from two circuits which are duplicated on the data sending side. On the other hand, on the data reception side, the two pieces of transmitted data are transferred to respective separate asynchronous transfer circuits and are received on receive-side clocks. If a send-side clock and a receive-side clock are asynchronous to each other, two pieces of data that have been transmitted at the same time from the send side, in other words, at the same cycle of the send-side clock are not necessarily to be received at the same cycle of the receive-side clock, on the reception side. Even though all of the same asynchronous transfer circuits are provided, the send-side clocks and the receive-side clocks are asynchronous to each other, such that it is difficult to completely synchronize the data acquisition timings on the reception side, and fluctuation occurs. Therefore, the input of data to a pair of duplicated circuits on the reception side has to be performed simultaneously, but data may be input at different cycles, due to the fluctuation of the reception timing. The receive-side circuit expects that the same data is input at the same time, the same processing is performed at the same time in parallel, and the same result is output, though the outputs from the two circuits are compared, if timing shift occurs in the input data, shift occurs in the outputs from the two circuits, and it is detected as a failure.

In this manner, if a pair of duplicated asynchronous transfer circuits is connected to duplicated circuits to which the same data is at the same time input, and in which the same result is expected to be at the same time output by the same processing being at the same time performed in parallel, and the outputs from two circuits are compared, the simultaneity expected is not ensured, such that there is a concern that it may be detected as a failure by mistake, though the failure does not occur. The same is applied to duplicated circuits to which the same data is input with a predetermined time difference, and in which the same result is expected to be output with the time difference by the same processing being performed in parallel with the time difference, and the outputs from the two circuits are compared. If a pair of asynchronous transfer circuits which are simply duplicated is connected, the expected same time difference is not ensured, such that there is a concern that failure may be erroneously detected, though the failure does not occur.

Although means for solving the problems will be described below, other problems and new features will be apparent from the description of this specification and the accompanying drawings.

Means for Solving the Problems

A brief description about the representative of the invention disclosed in the present application is as follows.

In other words, in a data processing device including two sets of a pair of circuits which are respectively duplicated in two clock domains which are asynchronous to each other, an asynchronous transfer circuit that transfers a payload signal is provided between the two sets of a pair of circuits. The asynchronous transfer circuit includes two sets of a pair of bridge circuits which are respectively connected to the two sets of a pair of circuits, and asynchronously transfers the payload signal and a control signal indicating a timing at which the payload signal is stable on a reception side. The two sets of a pair of bridge circuits and the payload signals can be duplicated, but the control signal is not duplicated, and the received payload signal is used for timing control to supply a expected same time difference, to the pair of duplicated circuits. A check control signal for checking the control signal may be added.

Effects of the Invention

A brief description about the effect obtained from the representative of the invention disclosed in the present application is as follows.

In other words, the asynchronous transfer between circuits which are respectively duplicated in the asynchronous clock domains is possible, and thus it is possible to achieve high performance and high reliability.

DESCRIPTION OF EMBODIMENTS

1. Summary of the Embodiments

Figure 1:
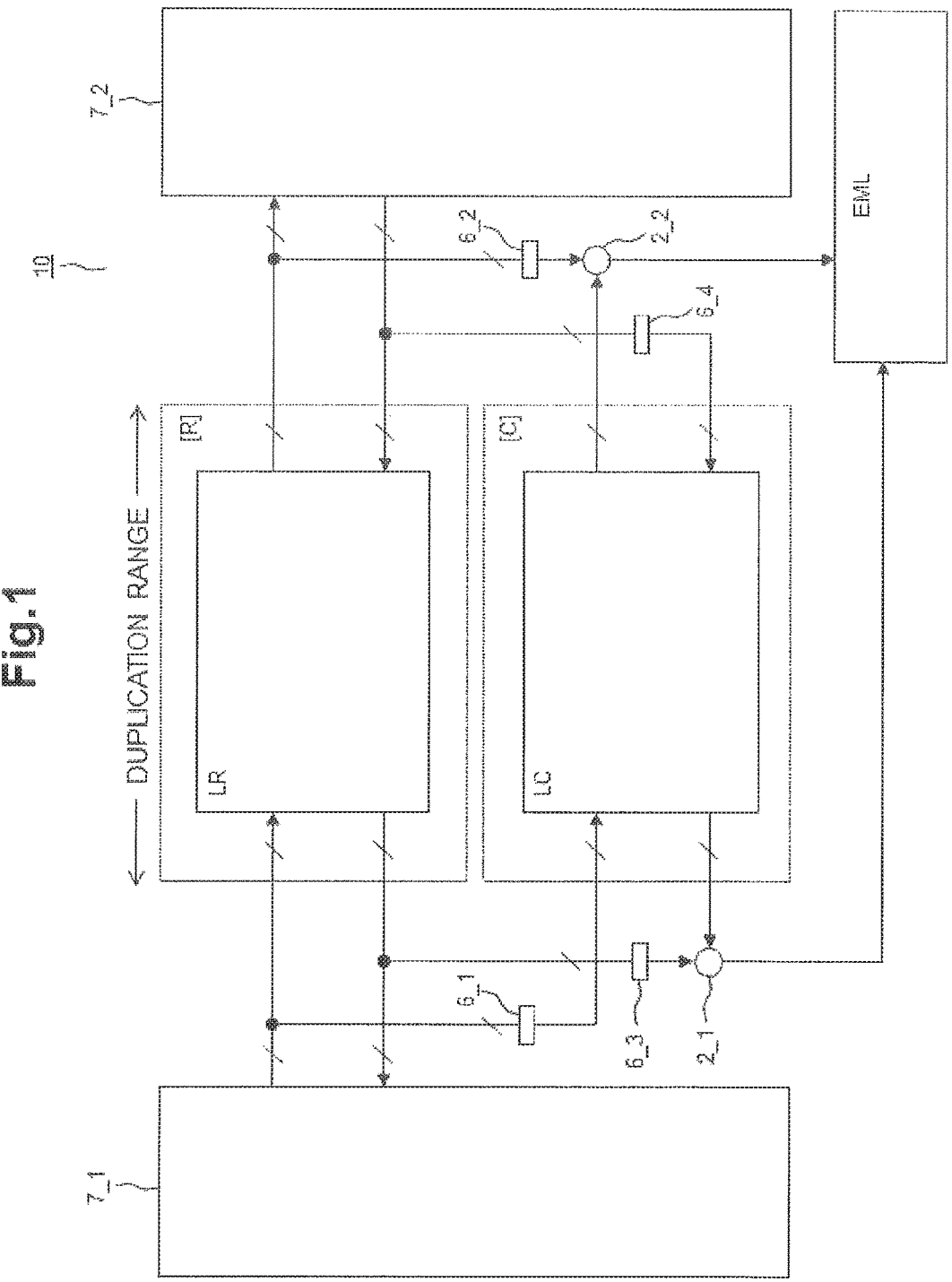
FIG. 1 is a block diagram illustrating a configuration example of a data processing device including a pair of circuits which are duplicated.

First, summary of representative embodiments of the invention disclosed in the application will be described.

Reference numerals in drawings in parentheses referred to in description of the summary of the representative embodiments just denote components included in the concept of the components to which the reference numerals are designated.

[1] <Asynchronous Transfer Between Two Sets of a Pair of Circuits which are Respectively Duplicated>

The representative embodiment disclosed in the present application is a data processing device (10) including two sets of a pair of circuits which are respectively duplicated and an asynchronous transfer circuit which is provided therebetween, and is configured as follows. The data processing device includes a first body circuit (LRA) and a first check circuit (LCA) which are duplicated in a first clock domain (ACLK), and a second body circuit (LRB) and a second check circuit (LCB) which are duplicated in a second clock domain (BCLK) which is asynchronous to the first clock domain. Further, the data processing device includes an asynchronous transfer circuit (1) that transfers a payload signal (P) between the first clock domain and the second clock domain.

The asynchronous transfer circuit includes a first body-side bridge circuit (BRA) and a first check-side bridge circuit (BCA) which are respectively connected to the first body circuit and the first check circuit, and are duplicated in the first clock domain. Further, the asynchronous transfer circuit includes a second body-side bridge circuit (BRB) and a second check-side bridge circuit (BCB) which are respectively connected to the second body circuit and the second check circuit, and are duplicated in the second clock domain.

The asynchronous transfer circuit has control signals (CsAB, CsBA) which are generated by the first or second body-side bridge circuit which transmits the payload signal and indicate a timing at which the payload signal is stable on the reception side, compares the control signal and check control signal (CsCAB, CsCBA) which are generated by the corresponding first or second check-side bridge circuit, and in a case of mismatch, detects as a failure.

This enables the asynchronous transfer between circuits which are respectively duplicated in the asynchronous clock domains, thereby achieving high performance and high reliability. Since two circuits operate asynchronously, it is possible to increase the operation frequency in each clock domain as necessary, without being constrained to the speed limit of the other circuit, thereby improving performance. Further, since the control signal is not to be duplicated in the asynchronous transfer circuit, this enables asynchronous transfer while maintaining the duplication relationship, and the other payload signals, the bridge circuits, or the like can be duplicated, thereby improving the reliability.

[2] <Duplication Type being Executed with a Constant Time Difference (FIG. 7)>

In Item 1, the first body circuit and the first check circuit respectively perform the same data processing with a time difference of a first number of cycles of 0 or more cycles in the first clock domain. Further, the second body circuit and the second check circuit respectively perform the same data processing with a time difference of a second number of cycles of 0 or more cycles in the second clock domain.

The asynchronous transfer circuit compares the output from the first body circuit and the output from the first check circuit with a time difference of the first number of cycles in the first clock domain, and in a case of mismatch, detects as a failure. The comparison between the control signal and the corresponding check control signal is performed with a time difference of the first number of cycles in the first clock domain (2_3), and the comparison is performed with a time difference of the second number of cycles in the second clock domain (2_4).

Thus, even in the duplication type in which the same data processing is executed with a constant time difference (the number of cycles), it is possible to properly detect failure.

[3] <Duplication of Payload Signal (FIG. 8)>

In Item 1, the first body-side bridge circuit transfers a payload signal (PR) and control signals (CsAB, CsBA) to the second body-side bridge circuit, the first check-side bridge circuit generates a check payload signal (PC) and a check control signal (CsCAB), and transfers the generated check payload signal to the second check-side bridge circuit.

The asynchronous transfer circuit compares the control signal and the check control signal in the first clock domain (2_3), and detects as failure in a case of mismatch.

The asynchronous transfer circuit transfers the control signal to the second clock domain.

In the asynchronous transfer circuit, based on the control signal which is transferred to the second clock domain, the second body-side bridge circuit receives the payload signal (4_R), the second check-side bridge circuit receives the check payload signal (4_C), and the asynchronous transfer circuit compares the payload signal and the check payload signal which are respectively received by the second body-side bridge circuit and the second check-side bridge circuit, and in a case of mismatch, detects as a failure.

Thus, in the asynchronous transfer circuit, the payload signal is duplicated, and it is possible to improve reliability.

[4] <Duplication Type Executed with a Constant Time Difference (FIG. 9)>

In Item 3, the first body circuit and the first check circuit respectively perform the same data processing with a time difference of a first number of cycles of 0 or more cycles in the first clock domain, and the second body circuit and the second check circuit respectively perform the same data processing with a time difference of a second number of cycles of 0 or more cycles in the second clock domain.

The asynchronous transfer circuit compares an output from the first body circuit and an output from the first check circuit with a time difference of the first number of cycles in the first clock domain, and in a case of mismatch, detects as a failure. The comparison between the control signal and the corresponding check control signal (2_3, 2_4) is performed in the first clock domain with a time difference of the first number of cycles, and the comparison between the payload signal and the check payload signal is performed in the second clock domain with a time difference of the second number of cycles.

Thus, as similar to Item 2, it is possible to properly detect failure even in the duplication type in which the payload signal is duplicated and the same data processing is executed with a constant time difference in an asynchronous transfer circuit.

[5] <Duplication of Payload Signal and Control Signal (FIG. 10)>

In Item 1, the first body-side bridge circuit transfers the payload signal (PR) and the control signals (CsRAB, CsRBA) to the second body-side bridge circuit.

The first check-side bridge circuit generates a check payload signal (PC) and the check control signals (CsCAB, CsCBA), and transfers the check payload signal and the check control signal to the second check-side bridge circuit.

The asynchronous transfer circuit compares the control signal and the check control signal in the second clock domain while allowing shift up to one cycle (2_7), and in a case of mismatch, detects as a failure.

Based on the control signal which is transferred to the second clock domain, the second body-side bridge circuit receives the payload signal (4_R), and the second check-side bridge circuit receives the check payload signal (4_C). The asynchronous transfer circuit compares the payload signal and the check payload signal which are respectively received by the second body-side bridge circuit and the second check-side bridge circuit, and in a case of mismatch, detects as a failure.

Thus, in the asynchronous transfer circuit, the payload signal and the control signal are duplicated, and it is possible to further improve reliability than the case of Item 3.

[6] <Duplication Type Executed with a Constant Time Difference (FIG. 11)>

In Item 5, the first body circuit and the first check circuit respectively perform the same data processing with a time difference of a first number of cycles of 0 or more cycles in the first clock domain, and the second body circuit and the second check circuit respectively perform the same data processing with a time difference of a second number of cycles of 0 or more cycles in the second clock domain.

The asynchronous transfer circuit compares the output from the first body circuit and the output from the first check circuit with a time difference of the first number of cycles in the first clock domain, and in a case of mismatch, detects as a failure.

The comparison between the control signal and the corresponding check control signal is performed in the second clock domain with a time obtained by adding a margin of plus or minus one cycle to the second number of cycles, if the signals match within the time difference including the margin, it is determined to match, and in a case of mismatch within a range of the margin, it is detected as a failure. The comparison between the payload signal and the check payload signal is performed in the second clock domain with a time difference of the second number of cycles.

Thus, as similar to Item 2, it is possible to properly detect failure even in the duplication type in which the payload signal and the control signal are duplicated and the same data processing is executed with a constant time difference in an asynchronous transfer circuit.

[7] <Comparison Between Three Control Signals (FIG. 10)>

In Item 5, the second body-side bridge circuit includes a second body-side flip-flop (4_R) that receives the payload signal, and the second check-side bridge circuit includes a second check-side flip-flop (4_C) that receives the check payload signal.

The asynchronous transfer circuit compares the respective following three signals (2_7), and in a case where at least one signal does not match the other signals, detects as a failure. Respective signals are a signal (N4-1-1) for providing an acquisition timing of the payload signal to the second body-side flip-flop based on the control signal, a signal (N4-1-2) for providing an acquisition timing of the check payload signal to the second check-side flip-flop based on the control signal, and the check control signal (N4-2).

Thus, in the asynchronous transfer circuit, a control signal and a check control signal, which are physically separated, are compared for acquiring a payload signal and a check payload signal, and it is possible to improve reliability than Item 5.

[8] <Duplication Type Executed with a Constant Time Difference (FIG. 11)>

In Item 7, the first body circuit and the first check circuit respectively perform the same data processing with a time difference of a first number of cycles of 0 or more cycles in the first clock domain, and the second body circuit and the second check circuit respectively perform the same data processing with a time difference of a second number of cycles of 0 or more cycles in the second clock domain.

The asynchronous transfer circuit compares the output from the first body circuit and the output from the first check circuit with a time difference of the first number of cycles in the first clock domain, and in a case of mismatch, it is detected as a failure.

Based on the control signal, the comparison between the signal (N4-1-1) for providing an acquisition timing of the payload signal to the second body-side flip-flop and the corresponding check control signal (N4-2) is performed in the second clock domain with a time difference obtained by adding a margin of plus or minus one cycle to the second number of cycles. Match is determined if the signals match within the time difference including the margin, and in a case of mismatch within a range of the margin, it is detected as a failure.

Based on the control signal, the comparison between the signal (N4-1-2) for providing an acquisition timing of the check payload signal to the second check-side flip-flop and the corresponding check control signal (N4-2) is performed in the second clock domain, and it is determined to match if the signals match within the time difference of plus or minus one cycle, and in a case of mismatch within a range of plus or minus one cycle, it is detected as a failure.

The comparison between the payload signal and the check payload signal is performed in the second clock domain with a time difference of the second number of cycles.

Thus, as similar to Item 2, it is possible to properly detect failure even in the duplication type in which the payload signal and the control signal are duplicated and the same data processing is executed with a constant time difference in an asynchronous transfer circuit.

[9] <Error Management Circuit (EML: Error Management Logic)>

In one item of Item 1 to Item 8, the data processing device further includes an error management circuit (EML) which is notified of the detection of failure.

Thus, the notifications of mismatch detected by the respective comparison circuits are aggregated to the error management circuit, and a process to cope with the detected failure (for example, interrupting, resetting, or the like) can be generated properly.

[10] <Dual CPUs+Dual Bus Bridges>

In the data processing device described in any one of Item 1 to Item 9, the first body circuit and the first check circuit are CPUs having the same circuit configuration capable of respectively executing the same program, and the second body circuit and the second check circuit are bus bridges each having the same circuit configuration.

Thus, in a micro-controller including dual CPUs+dual bus bridges, it is possible to achieve both high performance and high reliability.

[11] <Single Chip Large Scale Integrated Circuit (LSI)>

In one item of Item 1 to Item 10, the data processing device is formed on a single semiconductor substrate.

Thus, a single-chip LSI is provided that enables the asynchronous transfer between two sets of a pair of circuits which are respectively duplicated in the asynchronous clock domains, such as dual CPUs+dual bus bridges, and thus it is possible to achieve high performance and high reliability.

[12] <Asynchronous Transfer from Duplicated Circuits to Another Circuit (FIG. 14)>

A semiconductor device according to an embodiment based on different point of view is a data processing device (10) including two sets of a pair of circuits which are respectively duplicated and an asynchronous transfer circuit which is provided therebetween, and is configured as follows. The data processing device includes a first body circuit (LRA) and a first check circuit (LCA) which operate in synchronization with the first clock (ACLK), and are duplicated to each other so as to respectively perform the same processing. Further, the data processing device includes a second circuit (LB) which operates in synchronization with a second clock (BCLK) which is asynchronous to the first clock, and an asynchronous transfer circuit (1) that performs asynchronous transfer of a payload signal between the first body circuit and the first check circuit, and the second circuit.

The asynchronous transfer circuit includes a first bridge circuit (BA) which operates in synchronization with the first clock and is connected to the first body circuit and the first check circuit, and a second bridge circuit (BB) which operates in synchronization with the second clock and is connected to the second circuit. The first bridge circuit and the second bridge circuit are connected with each other through the payload signal and asynchronous transfer control signals (CsAB, CsBA) indicating a timing at which the payload signal is stable on the reception side.

The first bridge circuit includes a first body-side conversion circuit (BRA) that converts input and output signals to and from the first body circuit into a first body-side payload signal (PRA) and first body-side asynchronous transfer control signals (CsRAB, CsRBA). Further, the first bridge circuit includes a first check-side conversion circuit (BCA) that converts input and output signals to and from the first check circuit into a first check-side payload signal (PCA) and first check-side asynchronous transfer control signals (CsCAB, CsCBA).

The first bridge circuit includes a first comparison circuit (2_3) that compares an output signal (CsRAB) to be transmitted to the second bridge circuit among the first body-side asynchronous transfer control signals and the corresponding output signal (CsCAB) among the first check-side asynchronous transfer control signals, and detects mismatch. The first bridge circuit transmits the output signal (CsRAB) among the first body-side asynchronous transfer control signals as the output signal (CsAB) among the asynchronous transfer control signals, to the second bridge circuit.

The second bridge circuit receives the payload signal, at a timing indicated by the input signal (CsAB), among the asynchronous transfer control signals which are received from the first bridge circuit, and provides the payload signal to the second circuit.

Thus, in a case where the duplicated circuits transmit the payload signal in the asynchronous transfer between the duplicated circuits and the circuit which operates asynchronously to the duplicated circuits (irrespective of whether it is duplicated or not), a first body-side conversion circuit and a first check-side conversion circuit, which are a part of the asynchronous transfer circuit, are duplicated to each other, thereby enabling the improvement of the reliability of the asynchronous transfer circuit, and achieving both high performance and reliability as a whole.

[13] <Asynchronous Transfer from Another Circuit to Duplicated Circuits (FIGS. 12, 13)>

Further, a semiconductor device according to an embodiment based on different point of view is a data processing device (10) including two sets of a pair of circuits which are respectively duplicated and an asynchronous transfer circuit which is provided therebetween, and is configured as follows. The data processing device includes a first body circuit (LRB) and a first check circuit (LCB) which operate in synchronization with the first clock (BCLK), and are duplicated to each other so as to respectively perform the same processing, and a second circuit (LA) which operates in synchronization with the second clock (ACLK) which is asynchronous to the first clock. Further, the data processing device includes an asynchronous transfer circuit (1) that performs the asynchronous transfer of the payload signal (P) between the first body circuit and the first check circuit, and the second circuit.

wherein the asynchronous transfer circuit includes a first bridge circuit (BB) which operates in synchronization with the first clock and is connected to the first body circuit and the first check circuit, and a second bridge circuit (BA) which operates in synchronization with the second clock and is connected to the second circuit. The first bridge circuit and the second bridge circuit are connected with each other through the payload signal and asynchronous transfer control signals (CsAB, CsBA) indicating a timing at which the payload signal is stable on the reception side.

The first bridge circuit includes a first body-side conversion circuit (BRB) that converts input and output signals to and from the first body circuit into a first body-side payload signal (PRB) and first body-side asynchronous transfer control signals (CsRBA, CsRAB). Further, the first bridge circuit includes a first check-side conversion circuit (BCB) that converts input and output signals to and from the first check circuit into the first check-side payload signal (PCB) and first check-side asynchronous transfer control signals (CsCBA, CsCAB). Further, the first bridge circuit includes a second comparison circuit (2_4) that compares an output signal (CsRBA) to be transmitted to the second bridge circuit among the first body-side asynchronous transfer control signals and the corresponding output signal (CsCBA) among the first check-side asynchronous transfer control signals, and detects mismatch.

The first bridge circuit receives the payload signal, at a timing indicated by the input signal (CsAB), among the asynchronous transfer control signals which are transferred from the second bridge circuit, and provides the payload signal to the first body circuit through the first body-side conversion circuit, and to the first check circuit through the first check-side conversion circuit, respectively.

Thus, in a case where the duplicated circuits receive the payload signal in the asynchronous transfer between the duplicated circuits and the circuit which operates asynchronously to the duplicated circuits (irrespective of whether it is duplicated or not), a first body-side conversion circuit and a first check-side conversion circuit, which are a part of the asynchronous transfer circuit, are duplicated to each other, thereby enabling the improvement of the reliability of the asynchronous transfer circuit, and achieving both high performance and reliability.

[14] <Asynchronous Transfer Between Two Sets of a Pair of Circuits which are Respectively Duplicated> (FIGS. 6 to 11)>

In Item 12, the second circuit includes a second body circuit (LRB) and a second check circuit (LCB) which operate in synchronization with the second clock, and are duplicated to each other so as to respectively perform the same processing.

The second bridge circuit includes a second body-side conversion circuit (BRB) that converts input and output signals to and from the second body circuit into a second body-side payload signal (PRB) and second body-side asynchronous transfer control signals (CsRAB, CsRBA). Further, the second bridge circuit includes a second check-side conversion circuit (BCB) that converts input and output signals to and from the second check circuit into the second check-side payload signal (PCB) and the second check-side asynchronous transfer control signals (CsCAB, CsCBA).

The second bridge circuit receives the payload signal, at a timing indicated by the input signal (CsAB), among the asynchronous transfer control signals which are received from the first bridge circuit, and provides the payload signal to the second body circuit through the second body-side conversion circuit, and to the second check circuit through the second check-side conversion circuit, respectively.

Thus, in the asynchronous transfer between duplicated circuits and circuits which operate asynchronously and are duplicated, similar to Item 1, it is possible to achieve both high performance and high reliability.

[15] <Duplication of Payload Signal (FIGS. 8, 9)>

In Item 12, the second circuit includes a second body circuit (LRB) and a second check circuit (LCB) which operate in synchronization with the second clock, and are duplicated to each other so as to respectively perform the same processing.

The second bridge circuit includes a second body-side conversion circuit (BRB) that converts input and output signals to and from the second body circuit into a second body-side payload signal (PRB) and second body-side asynchronous transfer control signals (CsRAB, CsRBA). Further, the second bridge circuit includes a second check-side conversion circuit (BCB) that converts input and output signals to and from the second check circuit into the second check-side payload signal (PCB) and the second check-side asynchronous transfer control signals (CsCAB, CsCBA).

The first bridge circuit transmits the check payload signal (PC) in addition to the payload signal.

In the second bridge circuit, the second body-side conversion circuit and the second check-side conversion circuit respectively receive the payload signal, at a timing indicated by the input signal (CsAB), among the asynchronous transfer control signals which are received from the first bridge circuit.

Thus, in the asynchronous transfer between duplicated circuits and circuits which operate asynchronously and are duplicated, similar to Item 3, it is possible to achieve both high performance and high reliability.

[16] <Duplication of Payload Signal and Control Signal (FIGS. 10, 11)>

In Item 12, the second circuit includes a second body circuit (LRB) and a second check circuit (LCB) which operate in synchronization with the second clock, and are duplicated to each other so as to respectively perform the same processing.

The second bridge circuit includes a second body-side conversion circuit (BRB) that converts input and output signals to and from the second body circuit into a second body-side payload signal (PRB) and second body-side asynchronous transfer control signals (CsRAB, CsRBA). Further, the second bridge circuit includes a second check-side conversion circuit (BCB) that converts input and output signals to and from the second check circuit into the second check-side payload signal (PCB) and the second check-side asynchronous transfer control signals (CsCAB, CsCBA).

The first bridge circuit transmits an output signal among the first body-side asynchronous transfer control signals as the output signal (CsRAB) among the asynchronous transfer control signals to the second bridge circuit, and transmits the first body-side payload signal as the payload signal (PR) to the second bridge circuit. Further, the first bridge circuit transmits an output signal as the check asynchronous transfer control signal (CsCAB) among the first check-side asynchronous transfer control signals to the second bridge circuit, and transmits the second check-side payload signal as a check payload signal (PC) to the second bridge circuit.

The second bridge circuit receives the payload signal so as to supply it as the second body-side payload signal to the second body-side conversion circuit, and receives the check payload signal so as to supply it as the second check-side payload signal to the second check-side conversion circuit, at a timing indicated by the input signal (CsRAB) among asynchronous transfer control signals. The second bridge circuit includes a third comparison circuit (2_7) that compares an input signal (CsRAB) among the asynchronous transfer control signals and an input signal (CsCAB) among the check asynchronous transfer control signals.

Thus, in the asynchronous transfer between duplicated circuits and circuits which operate asynchronously and are duplicated, similar to Item 5, it is possible to achieve both high performance and high reliability.

[17] <Comparison Between Three Asynchronous Transfer Control Signals (FIGS. 10, 11)>

In Item 16, the third comparison circuit compares a signal of a node at which an input signal (CsRAB) among the asynchronous transfer control signals is supplied to the first body-side conversion circuit, a signal of a node which is input to the second check-side conversion circuit, and an input signal (CsCAB) of the check asynchronous transfer control signal, and detects that at least one signal does not match the other signals.

Data Processing Device

Thus, in the asynchronous transfer circuit, a control signal and a check control signal, which are physically separated, are compared for acquiring a payload signal and a check payload signal, and it is possible to improve reliability than Item 16.

[18] <Duplication Type Executed with a Constant Time Difference (FIGS. 7, 9, 11)>

In the data processing device described in any one of Item 12 to Item 17, the first body circuit and the first check circuit perform the same processing with a difference of a predetermined number of cycles of 0 or more cycles from the first clock.

Thus, even in the duplication type in which the same data processing is executed with a constant time difference, it is possible to properly detect failure.

[19] <Error Management Circuit (EML)>

In one item of Item 12 to Item 18, the data processing device further includes an error management circuit (EML) which is notified of the occurrence of mismatch in any of all of the comparison circuits.

Thus, the notifications of mismatch detected by the respective comparison circuits are aggregated to the error management circuit, and a process to cope with the detected failure (for example, interrupting, resetting, or the like) can be generated properly.

[20] <A Single Chip LSI>

In one item of Item 12 to Item 19, the data processing device is formed on a single semiconductor substrate.

Thus, a single-chip LSI is provided that enables the asynchronous transfer between two sets of a pair of circuits which are respectively duplicated in the asynchronous clock domains, such as dual CPUs+dual bus bridges, or between two duplicated circuit pairs such as dual bus bridges and peripheral circuit modules which are not duplicated, and thus it is possible to achieve high performance and high reliability.

2. Further Detailed Description of the Embodiments

The embodiments will be described in more detail. In addition, in all of the drawings for describing the embodiments of the invention, the same reference numerals will be given to the components having the same functions, and the repetitive description thereof will be omitted.

First, problems to solve will be described in more detail.

FIG. 1 is a block diagram illustrating a configuration example of a data processing device 10 including a pair of duplicated circuits. In the data processing device 10, two (one pair of) logic circuits LR and LC which are duplicated to each other, comparison circuits 2_1 and 2_2 that compare the outputs thereof, and an error management circuit EML (Error Management Logic) which is notified of mismatch in a case where a comparison result is mismatch are included, between two normal logic circuits 7_1 and 7_2 which are not duplicated to each other. The data processing device 10 illustrated in FIG. 1 is configured to include a plurality of delay circuits 6_1 to 6_4 of which each includes a predetermined number of stages of flip-flops. The body-side circuit LR which is one of the duplicated logic circuits is referred to as "Reference" and abbreviated as "[R]", and the check-side circuit LC which is on the other side is referred to as "Checker" and is abbreviated as "[C]". In addition, some signal lines are indicated by bus notation indicating that it consists of multiple signal lines, but the same description is appropriate for a single signal line. This is the same in this entire specification.

In general, since the same input is given to a pair of duplicated circuits, and results (outputs) which are obtained by respectively performing the same process in parallel are always compared, in a case where a fault occurs due to either the body-side circuit LR or the check-side circuit LC, it is possible to detect the fault as a failure. A signal from a block which is not duplicated is input to both the body-side circuit LR and the check-side circuit LC. With respect to the output signals of the body-side circuit LR and the check-side circuit LC, the output only from the body-side circuit LR is connected to a block which is not duplicated, and the output signal from the check-side circuit LC is used only for comparison. The operation cycles of the body-side circuit LR and the check-side circuit LC are likely to be shifted intentionally by one or two cycles, from a restriction on the chip layout (for example, in a case where it is difficult to supply signals to the body-side circuit LR and the check-side circuit LC at the same timing), or a restriction on the operation safety (for example, a request for avoiding an operation error from occurring in both the body-side circuit LR and the check-side circuit LC at the same time). In this case, a delay circuit (flip-flop) for shifting the operation is used. The delay circuits (flip-flops) receive signals to be input to the check-side circuit LC side from a circuit which is not duplicated, and signals to be input to a comparator from the body-side circuit LR.

In the data processing device 10 illustrated in FIG. 1, the input which is from the logic circuit 7_1 to the body-side circuit LR is shifted in the delay circuit 6_1 by a predetermined number of cycles is input to the check-side circuit LC, and the input which is from the logic circuit 7_2 to the body-side circuit LR is also shifted in the delay circuit 6_2 by the same number of cycles is input to the check-side circuit LC in the same manner. Although the body-side circuit LR and the check-side circuit LC are the same circuit and perform the same process, since the inputs are shifted by the predetermined number of cycles, the outputs of the execution and the result of the process are also shifted by the same number of cycles. The output which is from the body-side circuit LR to the logic circuit 7_1 is input to the comparison circuit 2_1 by being delayed in the delay circuit 6_2 by the same number of cycles, and is compared with the output which is from the check-side circuit LC to the logic circuit 7_1, and the output which is from the body-side circuit LR to the logic circuit 7_2 is input to the comparison circuit 2_2 by being delayed in the delay circuit 6_3 by the same number of cycles, and is compared with the output which is from the check-side circuit LC to the logic circuit 7_2. The error management circuit EML is notified of the mismatch which is detected by the comparison circuits 2_1 and 2_2. The error management circuit EML starts processing to be executed when a failure is detected, such as an interrupt processing or resetting.

A description will be given on asynchronous transfer. Since an asynchronous bridge (an asynchronous transfer circuit) is used for data transfer between data processing circuits which operate at high speed, clock domains can be asynchronous to each other, and there is no need to consider the timings in the two domains (it is almost not necessary to handle the logical delay of a combination circuit). Therefore, faster clock frequencies can be expected. This technique is used, in a case where fast clocks are required, or in a case where it is not possible to use synchronized clocks. However, all of timings may not be considered and it is likely to provide a constraint such that the shift of the delay value between the control signals has to fit in a constant period of time.

Figure 2:
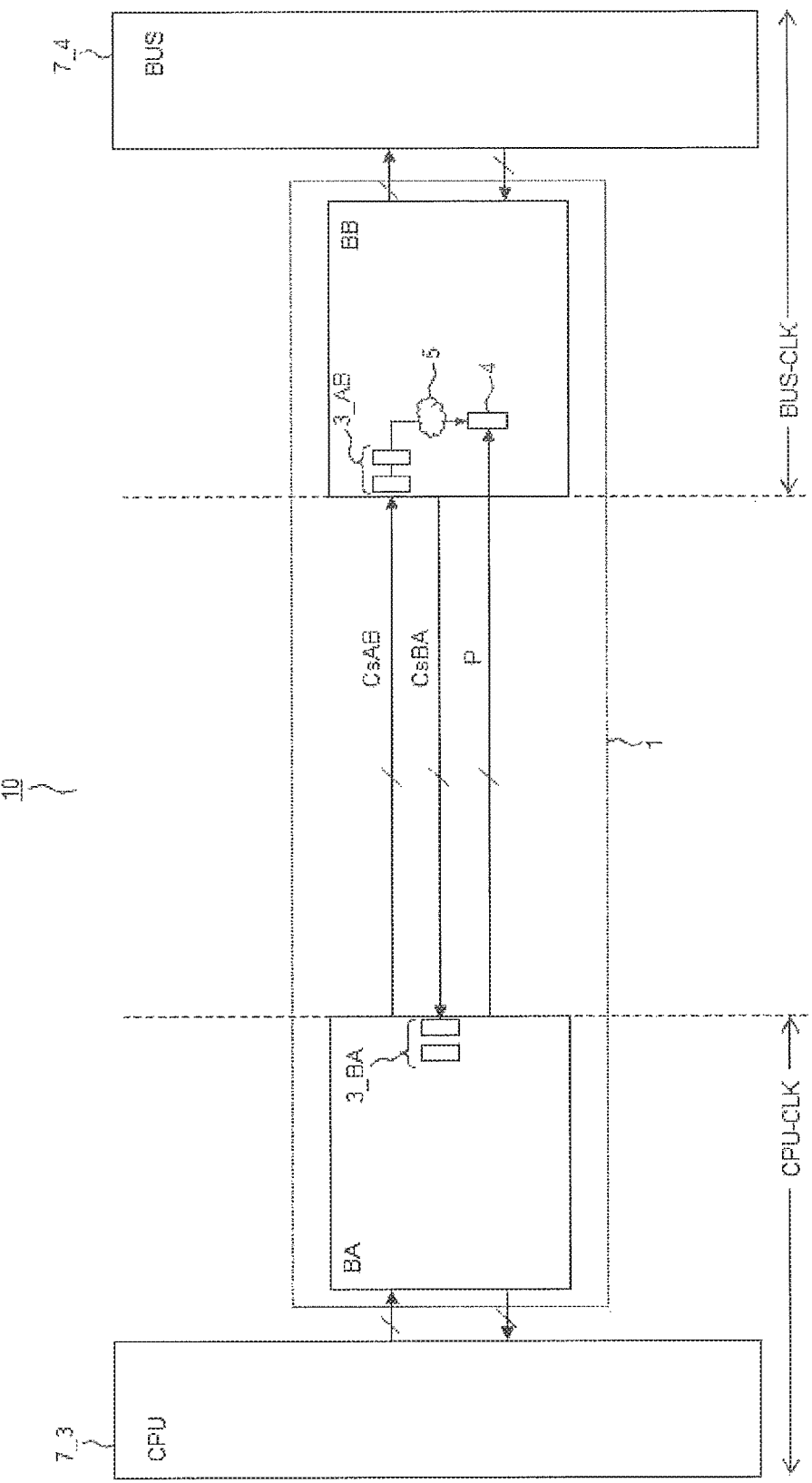
FIG. 2 is a block diagram illustrating a configuration example of a data processing device including an asynchronous transfer circuit.

FIG. 2 is a block diagram illustrating a configuration example of the data processing device 10 including the asynchronous transfer circuit 1. An asynchronous transfer circuit (asynchronous bridge) 1 is provided between a CPU 7_3 that operates synchronously with a CPU clock CPU-CLK and a bus (BUS) 7_4 that operates synchronously with a bus clock BUS-CLK. The asynchronous transfer circuit 1 includes a CPU-side bridge circuit BA that operates synchronously with the CPU clock CPU-CLK, and a bus-side bridge circuit BB that operates synchronously with the bus clock BUS-CLK. It is assumed that the CPU-side bridge circuit BA exchanges signals with the CPU 7_3, for example, in bus protocol, and the bus-side bridge circuit BB exchanges signals with the bus 7_4, for example, in the same (or different) bus protocol. When the CPU-side bridge circuit BA transfers the payload signal P to the bus-side bridge circuit BB, control signals CsAB and CsBA for indicating stable timings are transmitted and received by the bus-side bridge circuit BB which has received the payload signal P. The control signal CsAB which is transmitted from the CPU-side bridge circuit BA is, for example, a valid signal indicating that the payload signal P is output and stable, and the control signal CsBA which is transmitted from the bus-side bridge circuit BB is, for example, a ready signal indicating that it is ready to receive the payload signal P. When a series of data is transmitted and received, the control signals CsAB and CsBA may be pointers respectively indicating an index of data to be transmitted and an index of received data. The control signal CsAB which is transmitted from the CPU-side bridge circuit BA is received by the flip-flop 3_AB that operates in the bus clock BUS_CLK domain, and is supplied to the flip-flop 4 through the combination circuit 5 that generates the acquisition timing of the payload signal P. The flip-flop 3_AB is a flip-flop for metastable suppression of an asynchronous signal, and is configured with flip-flops of two or more stages. The acquisition timing is intended to ensure a timing at which the payload signal P is stable for the bus clock BUS_CLK. The flip-flop 3_BA is a flip-flop for metastable suppression of an asynchronous signal, and is configured with flip-flops of two or more stages. The flip-flop 3_BA receives the control signal CsBA which is transmitted from the bus-side bridge circuit BB in the CPU-side bridge circuit BA. The control signals CsAB and CsBA do not need to be necessarily bi-directional. For example, in a case where a period in which the payload P is sent is guaranteed to be a constant interval or more, only a "Valid" signal may be used as CsAB, and only a "Ready" signal may also be used as CsBA. FIG. 2 illustrates only a case where the payload signal is transferred from the CPU side to the bus side, but an asynchronous transfer circuit of a reverse direction can also be configured similarly. These matters are not limited to Embodiment 1, and are also reasonable for all of embodiments similarly.

A case is considered in which a circuit for data processing including asynchronous transfer is duplicated in view of safety.

Figure 3:
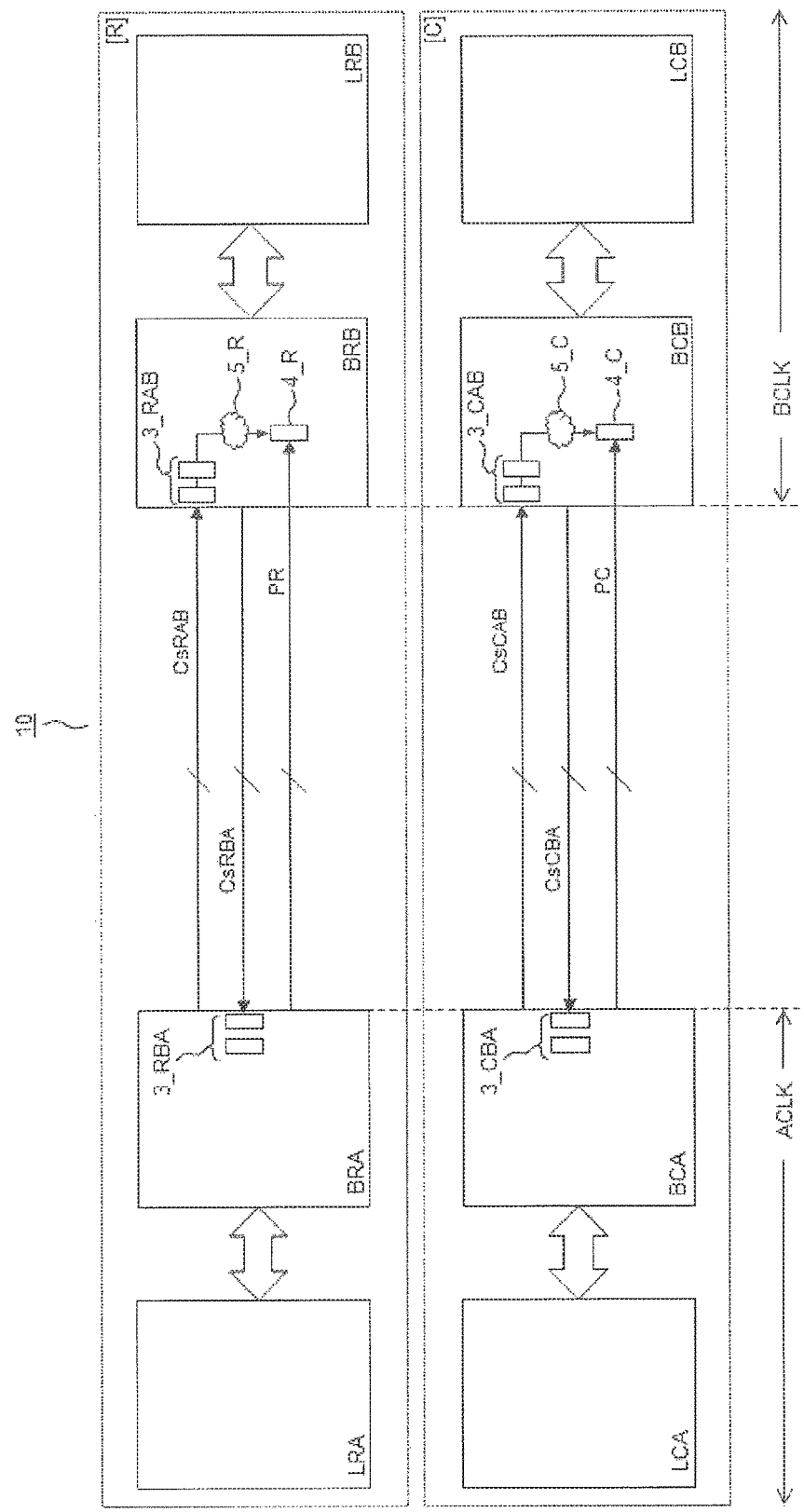
FIG. 3 is a block diagram illustrating a configuration example (a comparative example) of a data processing device in which the asynchronous transfer circuit illustrated in FIG. 2 is provided between two sets of a pair of circuits which are respectively duplicated.

FIG. 3 is a block diagram illustrating a configuration example (comparative example) of a data processing device in which the asynchronous transfer circuit illustrated in FIG. 2 is provided between two sets of a pair of circuits which are respectively duplicated.

In the body-side [R], an ACLK-side body circuit LRA and a BCLK-side body circuit LRB which operate in synchronism with the clocks ACLK and BCLK which are asynchronous to each other are connected to each other through an asynchronous transfer circuit configured with an ACLK-side bridge circuit BRA and a BCLK-side bridge circuit BRB. The bridge circuit BRA sends the control signal CsRAB and the payload signal PR, the bridge circuit BRB receives the control signal CsRAB in the flip-flop 2_RAB, and the payload signal PR is acquired by the flip-flop 4_R in response to a timing signal generated by the combination circuit 5_R. The bridge circuit BRB sends the control signal CsRBA, and the bridge circuit BRA receives the control signal CsRBA in the flip-flop 3_RBA.

In the check-side [C], an ACLK-side check circuit LCA and a BCLK-side check circuit LCB which respectively operate in synchronism with the clocks ACLK and BCLK which are asynchronous to each other are connected to each other through an asynchronous transfer circuit configured with an ACLK-side bridge circuit BCA and a BCLK-side bridge circuit BCB. The bridge circuit BCA sends the control signal CsCAB and the payload signal PC, the bridge circuit BCB receives the control signal CsCAB in the flip-flop 2_CAB, and the payload signal PC is acquired by the flip-flop 4_C in response to a timing signal generated by the combination circuit 5_C. The bridge circuit BCB sends the control signal CsCBA, and the bridge circuit BCA receives the control signal CsCBA in the flip-flop 3_CBA.

The body circuit LRA and the check circuit LCA on the ACLK side are duplicated, for example, as illustrated in FIG. 1, and a comparison circuit, not illustrated, that detects mismatch is provided. The body circuit LRB and the check circuit LCB on the BCLK side are also duplicated similarly, and a comparison circuit, not illustrated, that detects mismatch is provided.

The control signals CsRAB, CsRBA, CsCAB, and CsCBA, and the payload signals PR and PC are signals which are asynchronous transferred between the ACLK domain and the BCLK domain. Both clocks (ACLK and BCLK) are asynchronous, and since a timing between both signals is not considered, a motion between the body-side [R] and the check-side [C] is likely to be shifted. Since the control signals CsRAB and CsCAB are transmitted from the ACLK domain, in view of ACLK, the signal state and data in the same clock cycle are identical if there is no failure. Similarly, since the payload signals PR and PC are transmitted from the ACLK domain, in view of ACLK, the signal state and data in the same clock cycle are identical if there is no failure. However, a timing at which the control signal CsRAB is acquired by the flip-flop 3_RAB in the BCLK domain and a timing at which the control signal CsCAB is acquired by the flip-flop 3_CAB in the BCLK domain are not necessarily the same cycle in the BCLK domain. This is because the phase difference in between ACLK and BCLK is arbitrary in asynchronous transfer. If timings at which the control signals CsRAB and CsCAB are acquired in the BCLK domain are different from each other, the timings at which the payload signals PR and PC are acquired are different. Therefore, the same data is expected to be originally supplied to the body circuit LRB and the check circuit LCB which are duplicated in the received BCLK domain, at the same cycle (or a time difference of a predetermined number of cycles), but a shift occurs in the cycle, which is actually supplied, a shift occurs in the output along with it, and thus a comparison result is mismatch.

In this manner, if a circuit pair including the asynchronous transfer circuit is simply duplicated, even in a case where the body side [R] and the check-side [C] have no logical problem in operations, that is, no failure, there is a possibility that the operation of them are different and a comparison error is detected.

Embodiment 1 (First Embodiment)

<Asynchronous Transfer Between Two Sets of a Pair of Circuits which are Respectively Duplicated>

Figure 4:
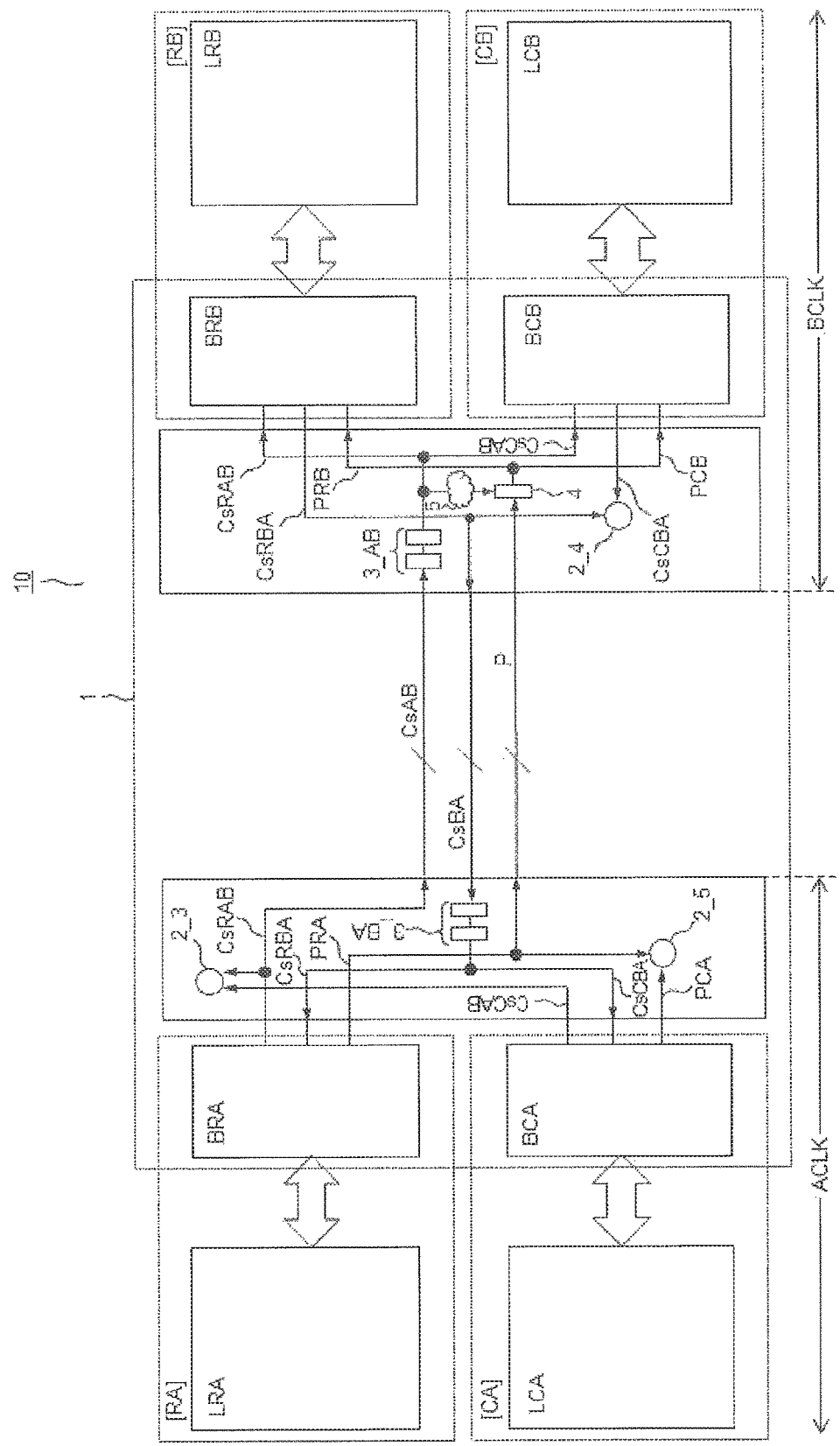
FIG. 4 is a block diagram illustrating a configuration example of a data processing device of Embodiment 1.

FIG. 4 is a block diagram illustrating a configuration example of the data processing device 10 of Embodiment 1. To solve the above problems, the data processing device 10 makes the body-side [RA] and the check side [CA] to be duplicated in the ACLK domain, and the body side [RB] and the check side [CB] to be duplicated in the BCLK domain, respectively, but a portion of the asynchronous transfer circuit is not to be duplicated. In other words, there are the body circuit LRA and the body-side bridge circuit BRA on the body side [RA] in the ACLK domain, and there are the check circuit LCA and the check-side bridge circuit BCA on the check side [CA]. There are the body circuit LRB and the body-side bridge circuit BRB on the body side [RB] in the BCLK domain, and there are the check circuit LCB and the check-side bridge circuit BCB on the check side [CB]. The asynchronous transfer circuit 1 is configured to include a body-side bridge circuit BRA and a check-side bridge circuit BCA which are respectively included on the body side [RA] and the check side [CA] and are duplicated to each other, a body-side bridge circuit BRB and a check-side bridge circuit BCB which are respectively included on the body side [RB] and the check side [CB] and are duplicated to each other, flip-flops 3_AB, 3_BA, and 4, a combination circuit 5, and comparison circuits 2_3, 2_4, and 2_5, which are not to be duplicated.

In the ACLK domain, the body-side bridge circuit BRA outputs a control signal CsRAB and a payload signal PRA, the check-side bridge circuit BCA outputs a control signal CsCAB and a payload signal PCA, the comparison circuit 2_3 compares the control signals CsRAB and CsCAB, and the comparison circuit 2_5 compares the payload signals PRA and PCA. Since they are in the same clock domain, as long as there is no failure, mismatch is not detected. From the ACLK domain, the control signal CsRAB is output as a control signal CsAB which is not duplicated, and the payload signal PRA is output as a payload signal P which is not duplicated.

In the BCLK domain, the control signal CsAB is acquired by the flip-flop 3_AB which is not duplicated, and the flip-flop 4 acquires the payload signal P, depending on a timing which is defined by the combination circuit 5. The control signal CsAB and the payload signal P, which are acquired in the BCLK domain, are input to the body-side bridge circuit BRB as CsRAB and PRB, and are input to the check-side bridge circuit BCB as CsCAB and PCB, but the acquisition circuit is not duplicated, such that cycle shift does not occur in principle.

In the BCLK domain, the body-side bridge circuit BRB outputs a control signal CsRBA, the check-side bridge circuit BCB outputs a control signal CsCBA, and the comparison circuit 2_4 compares the control signals CsRBA and CsCBA. Since the cycle shift does not occur in the control signals CsRAB and CsCAB, and the payload signals PRB and PCB, which are input as described above, as long as there is no failure, mismatch is not detected. From the BCLK domain, the control signal CsRBA is transmitted as a control signal CsBA which is not duplicated. A control signal CsBA is acquired by the flip-flop 3_BA which is not duplicated, in the ACLK domain, and is input to the body-side bridge circuit BRA and the check-side bridge circuit BCA respectively as CsRBA and CsCBA.

As described above, the body-side [RA] and the check side [CA] in the ACLK domain and the body-side [RB] and the check side [CB] in the BCLK domain are respectively duplicated while timing shift described above does not occur. Circuits which are not to be duplicated are the flip-flops 3_AB and 3_BA, the flip-flop 4, and the combination circuit 5, and the scale is extremely smaller as compared to that of the circuits which are duplicated, such that a decrease in the fault coverage caused by the fact that they are not to be duplicated is extremely limited. This enables asynchronous transfer between circuits which are respectively duplicated in the asynchronous clock domains, thereby achieving high performance and high reliability.

In the above description, a description has been given only on the transfer from the ACLK domain to the BCLK domain, but it is also possible to configure asynchronous transfer in the opposite direction in the same way, and achieve the same effects.

<Dual CPUs+Dual Bus Bridges>

Figure 5:
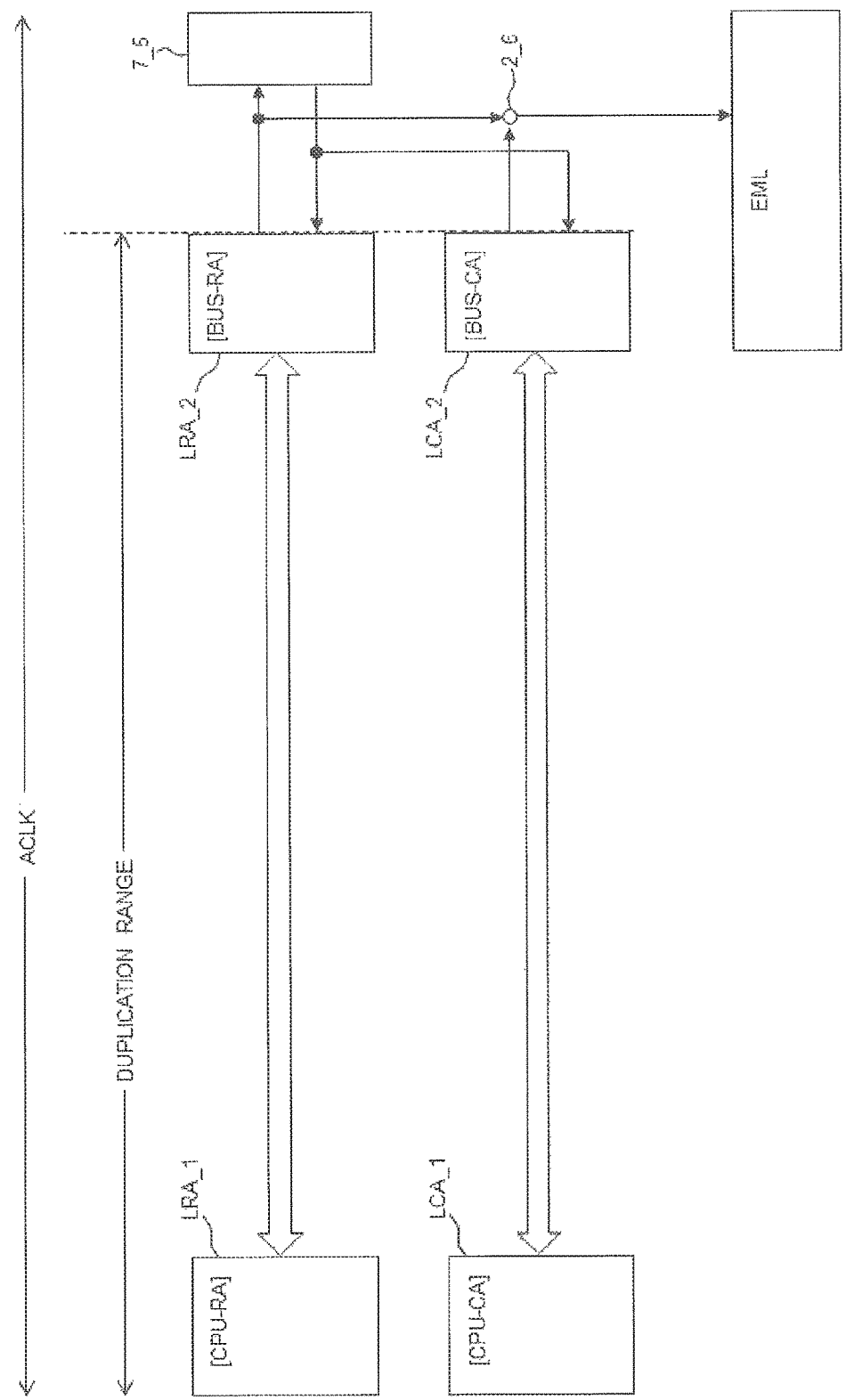
FIG. 5 is a block diagram illustrating a configuration example of a data processing device including CPUs and buses which are respectively duplicated.

FIG. 5 is a block diagram illustrating a configuration example of a data processing device including CPUs and buses which are respectively duplicated. A data processing device 10 includes a CPU-RA (LRA_1) and a bus-RA (BUS-RA) on the body side [RA], a CPU-CA (LCA_1) and a bus-CA (BUS-CA) on a check side [CA], a comparison circuit 2_6, an error management circuit EML, and another logic circuit 7_5 which is not duplicated. Examples of another logic circuit 7_5 include a memory, a peripheral circuit module, or the like. The input from the logic circuit 7_5 is input to the CPU-RA (LRA_1) and the CPU-CA (LCA_1) in parallel, through the bus-RA (BUS-RA) and bus-CA (BUS-CA), as the same input data. The CPU-RA (LRA_1) and the CPU-CA (LCA_1) perform the same process, and if there is no error or the like, they output the same processing result. The comparison circuit 2_6 compares the output from the bus-RA (BUS-RA) and the output from the bus-CA (BUS-CA), and in a case of mismatch, it informs the error management circuit EML of the occurrence of an error in one or both of the body-side [RA] and the check side [CA]. The error management circuit EML starts a predetermined process to cope with failure, such as an interrupt processing or resetting. FIG. 5 illustrates a data processing device 10 of which all parts perform synchronization operations in the ACLK domain. Each of the duplicated CPUs and the duplicated buses, that respectively receive the same data, performs the same process in parallel at the same time, and is expected to output the same processing result at the same time. Therefore, the comparison circuit 2_6 compares the output of the bus-RA (BUS-RA) and the output of the bus-CA (BUS-CA) every cycle always, thereby detecting a failure occurring at one time. In addition, the body-side [RA] and the check side [CA] may be configured to perform the same process, while their frequencies are shifted intentionally only by a predetermined number of cycles, as described with reference to FIG. 1.

Since all parts operate in the ACLK domain, as described above, the timing control for the comparison of the processing results is easy, and it is possible to monitor the failure at all times by operating the comparison circuit 2_6 every cycle always. On the other hand, in order to make the CPU and the bus operate synchronously with each other in the same clock domain, the operation frequency is adjusted to the lower performance limit of any one, such that the whole of the operation frequency is limited.

Figure 6:
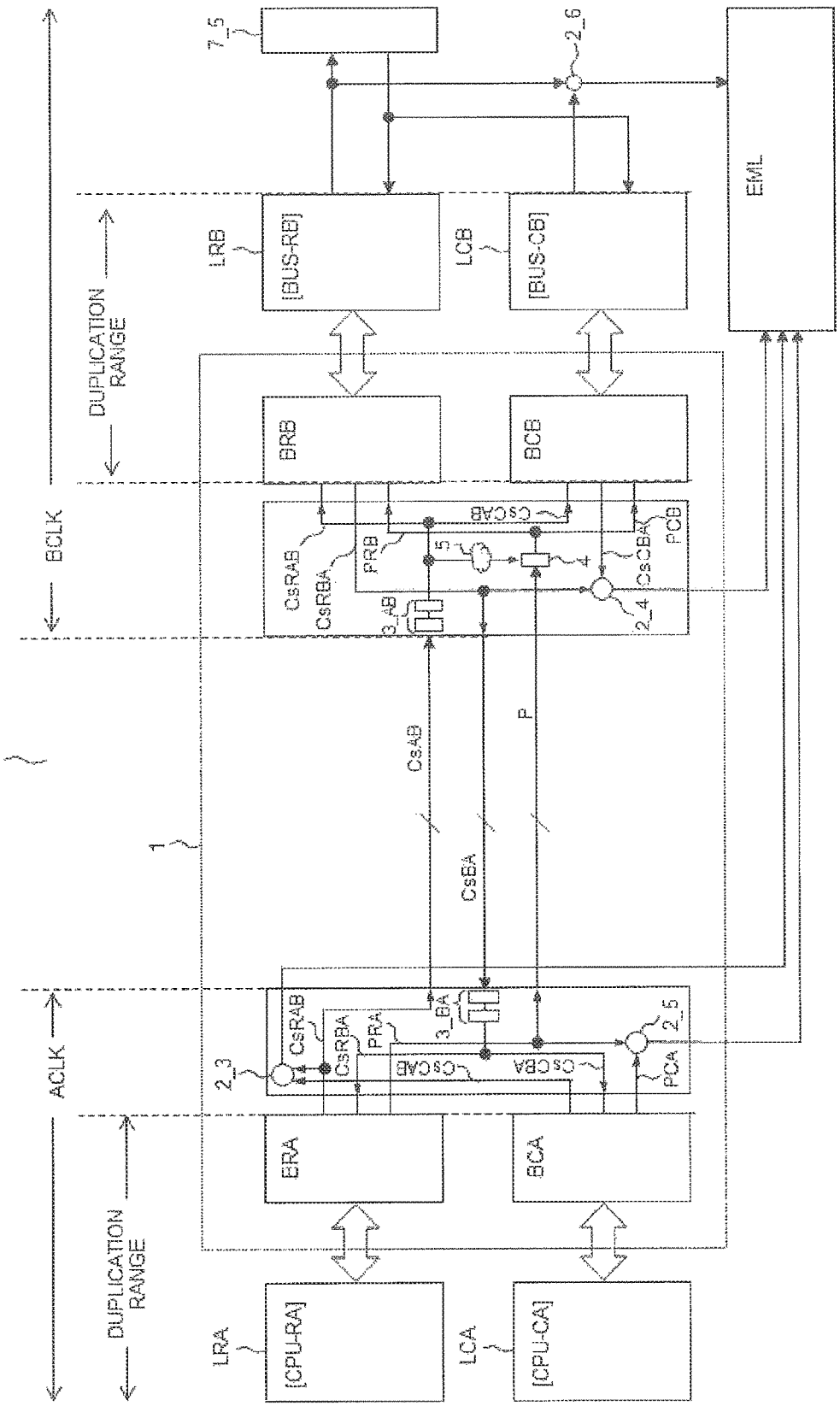
FIG. 6 is a block diagram illustrating a configuration example of a data processing device including CPUs and buses which respectively operate asynchronously to each other and are respectively duplicated, as an example of Embodiment 1.

FIG. 6 is a block diagram illustrating a configuration example of a data processing device 10 including CPUs and buses which respectively operate asynchronously to each other and are respectively duplicated, as an example of Embodiment 1. Similar to the data processing device illustrated in FIG. 5, the data processing device 10 includes a CPU-RA (LRA_1) and a bus-RA (BUS-RA) on the body side [RA], a CPU-CA (LCA_1) and a bus-CA (BUS-CA) on a check side [CA], a comparison circuit 2_6, an error management circuit EML, and another logic circuit 7_5 which is not duplicated, such as, for example, a memory or a peripheral circuit module. The comparison circuit 2_6 compares the output from the bus-RA (BUS-RA) and the output from the bus-CA (BUS-CA), and in a case of mismatch, it informs the error management circuit EML of the occurrence of an error in one or both of the body-side [RA] and the check side [CA]. In the data processing device 10 of the present embodiment, the CPU-RA (LRA_1) on the body side [RA] and the CPU-CA (LCA_1) on the check-side [CA] are duplicated in the ACLK domain, the bus-RA (BUS-RA) on the body side [RB] and the bus-CA (BUS-CA) on the check-side [CB] are duplicated in the BCLK domain, and an asynchronous transfer circuit 1 is provided in the interface between the ACLK domain and the BCLK domain.

The asynchronous transfer circuit 1 is configured to include a body-side bridge circuit BRA and a check-side bridge circuit BCA which are duplicated in the ACLK domain, a body-side bridge circuit BRA and a check-side bridge circuit BCA which are duplicated in the BCLK domain, flip-flops 3_AB, 3_BA, and 4, a combination circuit 5, and comparison circuits 2_3, 2_4, and 2_5, which are not to be duplicated. In the ACLK domain, the body-side bridge circuit BRA is connected to the CPU-RA (LRA_1) on the body side [RA], and the check-side bridge circuit BCA is connected to the CPU-CA (LCA_1) on the check-side [CA]. They are respectively duplicated, and perform input and output of data or the like conforming to, for example, a predetermined bus protocol. In the BCLK domain, the body-side bridge circuit BRB is connected to the BUS-RB (LRB) on the body side [RB], and the check-side bridge circuit BCB is connected to the BUS-CA (LCB) on the check-side [CB]. They are respectively duplicated, and perform input and output of data or the like conforming to, for example, a predetermined bus protocol.

In the ACLK domain, the body-side bridge circuit BRA outputs a control signal CsRAB and a payload signal PRA, the check-side bridge circuit BCA outputs a control signal CsCAB and a payload signal PCA, the comparison circuit 2_3 compares the control signals CsRAB and CsCAB, and the comparison circuit 2_5 compares the payload signals PRA and PCA. Since they are in the same clock domain, as long as there is no failure, mismatch is not detected. From the ACLK domain, the control signal CsRAB is output as a control signal CsAB which is not duplicated, and the payload signal PRA is output as a payload signal P which is not duplicated.

In the BCLK domain, the control signal CsAB is acquired by the flip-flop 3_AB which is not duplicated, and the flip-flop 4 acquires the payload signal P, depending on a timing which is defined by the combination circuit 5. The control signal CsAB and the payload signal P, which are acquired in the BCLK domain, are input to the body-side bridge circuit BRB as CsRAB and PRB, and are input to the check-side bridge circuit BCB as CsCAB and PCB, but the acquisition circuit is not duplicated, such that cycle shift does not occur in principle.

In the BCLK domain, the body-side bridge circuit BRB outputs a control signal CsRAB, the check-side bridge circuit BCB outputs a control signal CsCAB, and the comparison circuit 2_4 compares the control signals CsRAB and CsCAB. Since the cycle shift does not occur in the control signals CsRAB and CsCAB, and the payload signals PRB and PCB, which are input as described above, as long as there is no failure, mismatch is not detected. From the BCLK domain, the control signal CsRBA is transmitted as a control signal CsBA which is not duplicated. A control signal CsBA is acquired by the flip-flop 3_BA which is not duplicated, in the ACLK domain, and is input to the body-side bridge circuit BRA and the check-side bridge circuit BCA respectively as CsRBA and CsCBA.

The notifications of mismatch from the respective comparison circuits 2_3, 2_4, 2_5 and 2_6 are aggregated to the error management circuit EML, and when mismatch is notified from at least one place, the error management circuit EML can generate a process to cope with the detected failure properly, for example, an interrupting, resetting, or the like.

As described above, a CPU-RA (LRA_1) on the body side [RA] and a CPU-CA (LCA_1) on the check side [CA] in the ACLK domain and a BUS-RB (LRB) on the body side [RB] and a BUS-CA (LCB) on the check side [CB] in the BCLK domain are respectively duplicated while timing shift described above does not occur. Thus, in a micro-controller including dual CPUs+dual bus bridges, it is possible to achieve both high performance and high reliability.

Without being particularly limited, the data processing device 10 is formed on a single semiconductor substrate such as silicon, by using, for example, a known manufacturing technology of a complementary metal-oxide-semiconductor field effect transistor (CMOS) LSI.

Thus, a single-chip LSI is provided that enables the asynchronous transfer between two sets of a pair of circuits which are respectively duplicated in the asynchronous clock domains, such as dual CPUs+dual bus bridges, and thus it is possible to achieve high performance and high reliability.

<Duplication Type Executed with a Constant Time Difference>

As described with reference to FIG. 1, the operations of the circuits on the body sides [RA] and [RB] and the circuits on the check-sides [CA] and [CB] which are duplicated, in other words, the circuits LRA and LCA, the circuits LRB and LCB, the CPU-RA (LRA_1), the CPU-CA (LCA_1), the BUS-RB (LRB) and the BUS-CB (LCB) are likely to be performed at timings which are intentionally shifted by one or two cycles, rather than at the same time, that is, in the same clock cycle.

Figure 7:
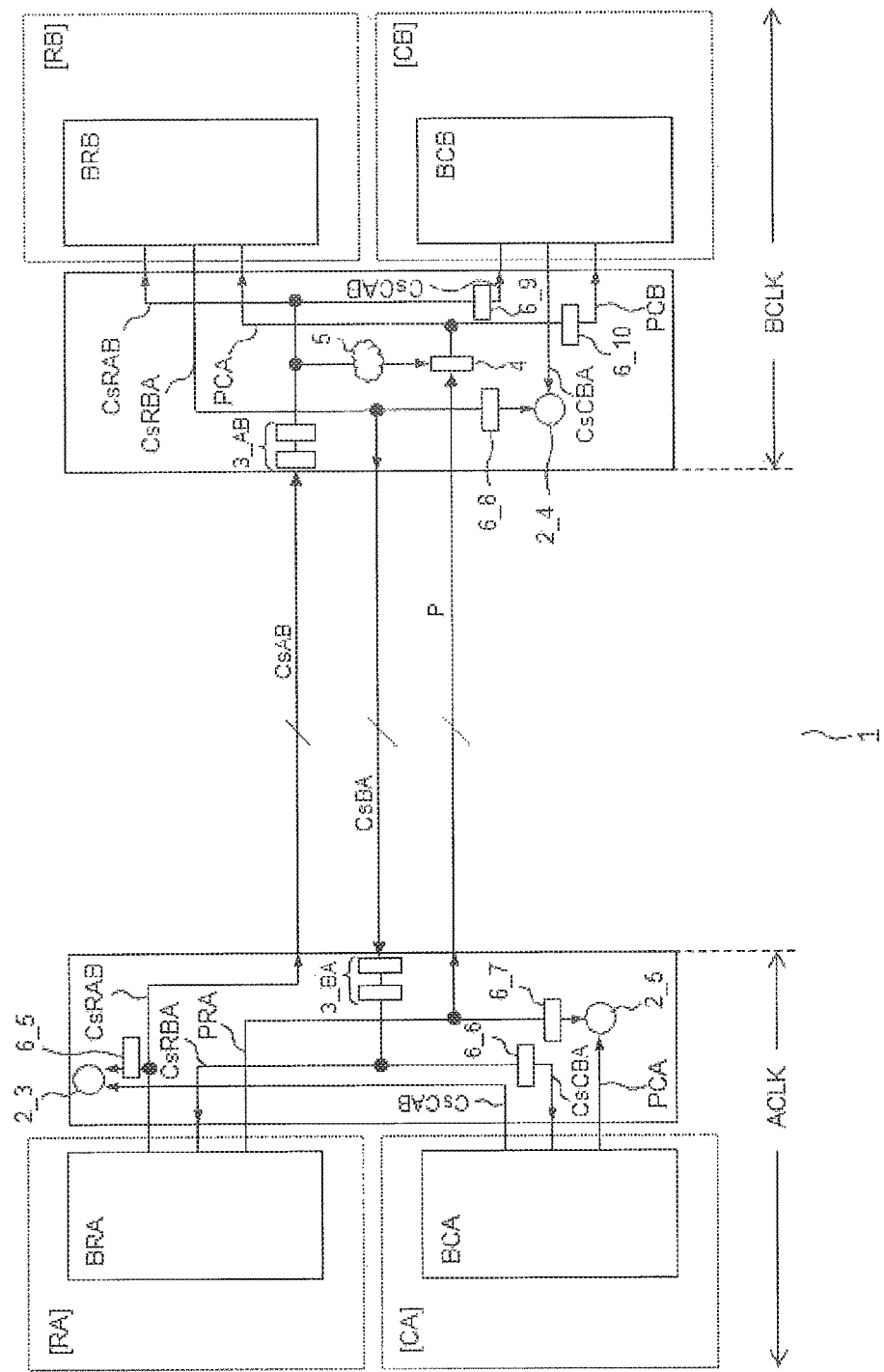
FIG. 7 is a block diagram illustrating another configuration example of an asynchronous transfer circuit included in a data processing device of Embodiment 1.

FIG. 7 is a block diagram illustrating another configuration example of the asynchronous transfer circuit 1 included in the data processing device 10 of Embodiment 1. FIG. 7 illustrates a configuration example only of the asynchronous transfer circuit 1, and it is possible to replace the asynchronous transfer circuit 1 which is provided in the data processing device 10 illustrated in FIG. 4 and FIG. 6. The asynchronous transfer circuit 1 includes a bridge circuit BRA on a body side [RA] and a bridge circuit BCA on a check side [CA] which are duplicated in the ACLK domain, a bridge circuit BRB on a body side [RB] and a bridge circuit BCB on a check side [CB] which are duplicated in the BCLK domain, flip-flops 3_AB, 3_BA, and 4, a combination circuit 5, and comparison circuits 2_3, 2_4, and 2_5, which are not to be duplicated. Since the configuration and operation are the same as the asynchronous transfer circuit 1 illustrated in FIG. 4 and FIG. 6, the description thereof will be omitted. The asynchronous transfer circuit 1 of another configuration example illustrated in FIG. 7 further includes delay circuits 6_5 to 6_10.

In the ACLK domain, the delay circuit 6_5 receives the control signal CsRAB which is output from the bridge circuit BRA on the body side [RA], delays it by a predetermined number of cycles, and outputs the delayed signal to the comparison circuit 2_3. The delay circuit 6_6 receives the control signal CsRBA which is transferred from the BCLK domain and received from the flip-flop 3_BA, delays it by a predetermined number of cycles, and outputs the delayed signal as a control signal CsCBA to the bridge circuit BRA on the check side [CA]. The delay circuit 6_7 receives the payload signal PRA which is output from the bridge circuit BRA on the body side [RA], delays it by a predetermined number of cycles, and outputs the delayed signal to the comparison circuit 2_5.

In the BCLK domain, the delay circuit 6_8 receives the control signal CsRBA which is output from the bridge circuit BRB on the body side [RB], delays it by a predetermined number of cycles, and outputs the delayed signal to the comparison circuit 2_4. The delay circuit 6_9 receives the control signal CsRAB which is transferred from the ACLK domain and received from the flip-flop 3_AB, delays it by a predetermined number of cycles, and outputs the delayed signal as a control signal CsCAB to the bridge circuit BRB on the check side [CA]. The delay circuit 6_10 receives the payload signal which is transferred from the ACLK domain and received from the flip-flop 4, delays it by a predetermined number of cycles, and outputs the delayed signal as a payload signal PCB to the bridge circuit BRB on the check side [CB].

The delay circuits 6_5 to 6_7 can be respectively configured with a flip-flop of one to several stages, and uniformly delay the operations of the circuit and bridge circuit BCA on the check side [CA] in the ACLK domain by one to several number of clock cycles with respect to the operations of the circuits and bridge circuit BRA on the body side [RA]. The delay circuits 6_8 to 6_10 can be respectively configured with a flip-flop of one to several stages, and uniformly delay the operations of the circuit and bridge circuit BCB on the check side [CB] in the BCLK domain by one to several number of clock cycles with respect to the operations of the circuits and bridge circuit BRB on the body side [RB]. The delay rate (the number of cycles) by the delay circuits 6_5 to 6_7 and the delay rate (the number of cycles) by the delay circuits 6_8 to 6_10 do not need to be the same.

Thus, even in the duplication type in which the same data processing is executed with a constant time difference (the number of cycles), it is possible to properly detect failure and improve reliability. Since the operations of the circuit on the body side [RA] and the circuit on the check-side [CB] are not performed at the same time, even in a case where external noise affecting the circuit on the body side [RA] and the circuit on the check-side [CB] is mixed, the processes which are executed at the time are different from each other, such that the errors are different even in a case where an error occurs in the processing results due to the noise, and thus it is possible to detect more accurately failure.

Embodiment 2

<Duplication of Payload Signal>

In Embodiment 1, since the control signals CsAB and CsBA and the payload signal P are not duplicated in the interface between the ACLK domain and the BCLK domain in the asynchronous transfer circuit 1, this enables the asynchronous transfer between the respective duplicated circuits in the asynchronous clock domains. In Embodiment 2, it is possible to further improve the reliability by duplicating the payload signal P in the interface between the ACLK domain and the BCLK domain in the asynchronous transfer circuit 1.

Figure 8:
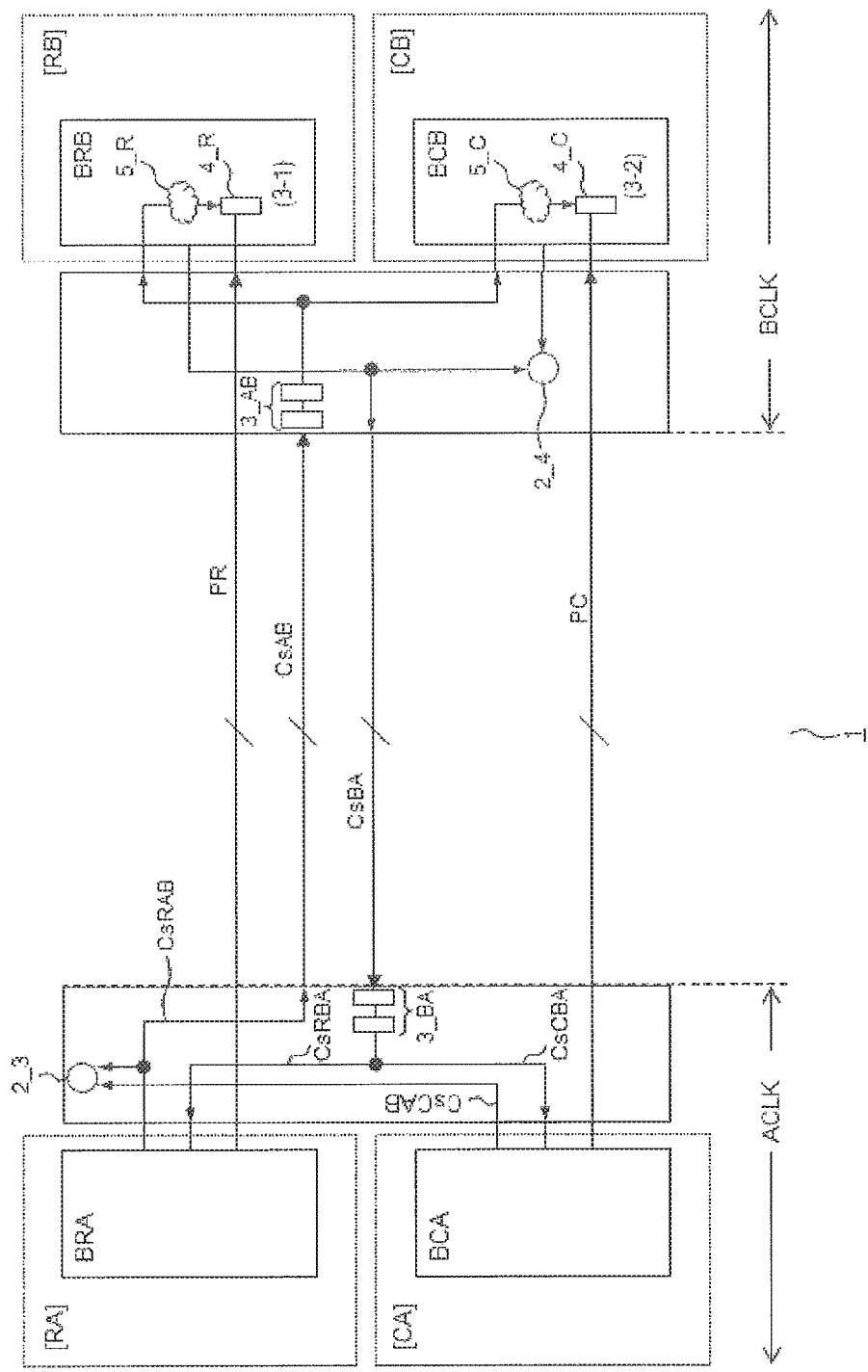
FIG. 8 is a block diagram illustrating a configuration example of an asynchronous transfer circuit included in a data processing device of Embodiment 2.

FIG. 8 is a block diagram illustrating a configuration example of an asynchronous transfer circuit 1 included in a data processing device 10 of Embodiment 2. The asynchronous transfer circuit 1 includes a bridge circuit BRA on a body side [RA] and a bridge circuit BCA on a check side [CA] which are duplicated in the ACLK domain, a bridge circuit BRB on a body side [RB] and a bridge circuit BCB on a check side [CB] which are duplicated in the BCLK domain, flip-flops 3_AB and 3_BA, and comparison circuits 2_3 and 2_4, which are not to be duplicated. Since the configuration and operation are the same as the asynchronous transfer circuit 1 illustrated in FIG. 4 and FIG. 6, the description thereof will be omitted. In the asynchronous transfer circuit 1 of Embodiment 2 illustrated in FIG. 8, the flip-flop 4_R, the combination circuit 5_R, the flip-flop 4_C, and the combination circuit 5_C are included in the bridge circuit BRB on the body side [RB] and the bridge circuit BCB on the check-side [CB], respectively, and are duplicated in the BCLK domain. A control signal CsAB which is transferred to the BCLK domain by the flip-flop 3_AB is input to the combination circuit 5_R in the bridge circuit BRB on the body side [RB] and the combination circuit 5_C in the bridge circuit BCB on the check side [CB], as it is. The combination circuit 5_R and the combination circuit 5_C perform the same operation as long as there is no failure, and the payload signals PR and PC which are duplicated and transferred are respectively acquired from the flip-flops 4_R and 4_C. Since the payload signals PR and PC are respectively output from the body-side [RA] circuit LRA and the check-side [CA] circuit LCA, which are duplicated in the ACLK domain through the bridge circuit BRA and the bridge circuit BCA, and have the same value as long as there is no failure, the payload signals which are respectively acquired from the flip-flops 4_R and 4_C are expected to have the same value.

As described above, in Embodiment 2, the payload signal P is duplicated to PR and PC in the interface between the ACLK domain and the BCLK domain in the asynchronous transfer circuit 1, and as well as the flip-flops 4_R and 4_C which are acquisition circuits and the combination circuits 5_R and 5_C are respectively duplicated, thereby further improving reliability.

<Duplication Type Executed with a Constant Time Difference>

Figure 9:
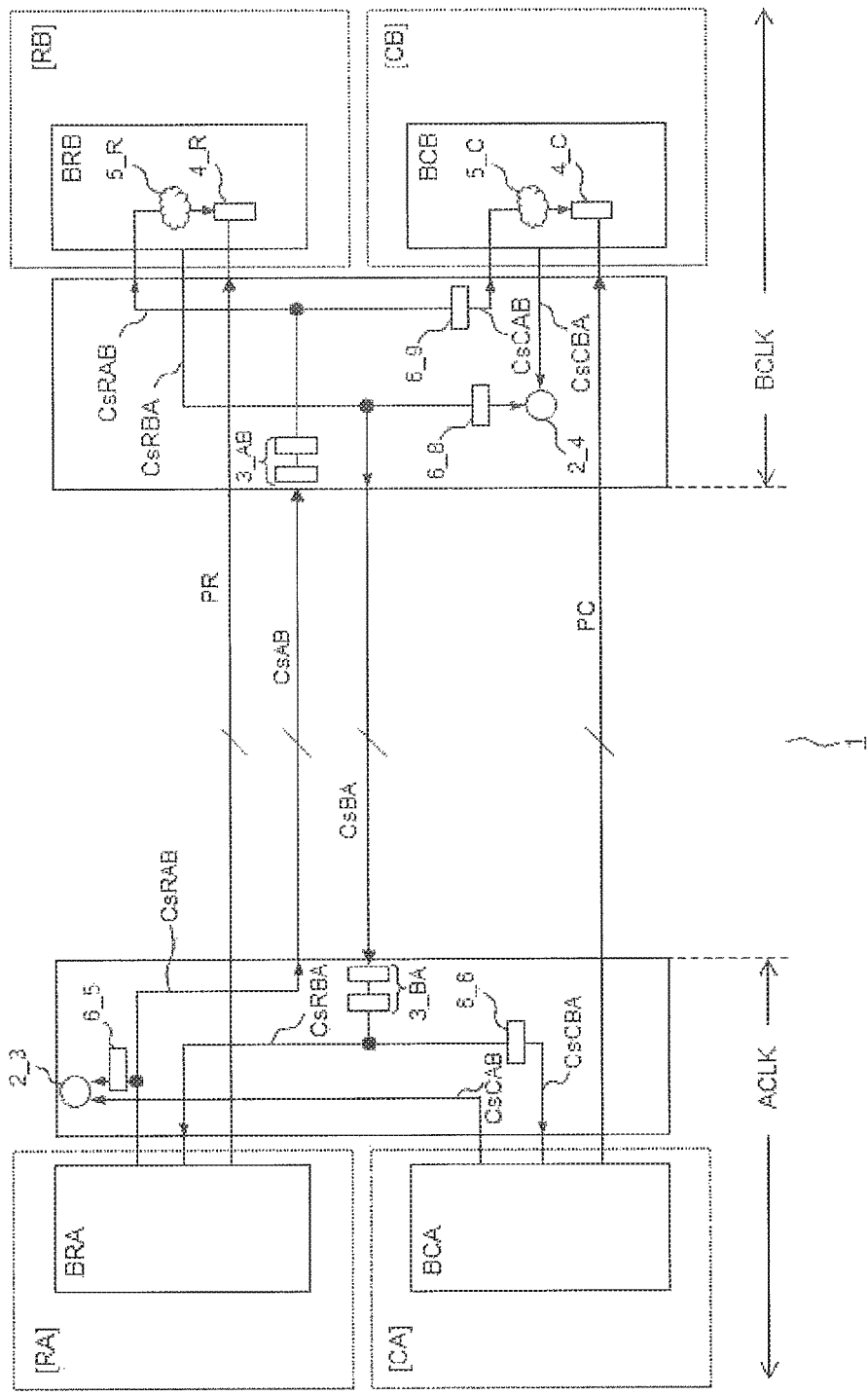
FIG. 9 is a block diagram illustrating another configuration example of the asynchronous transfer circuit included in the data processing device of Embodiment 2.

FIG. 9 is a block diagram illustrating another configuration example of the asynchronous transfer circuit 1 included in the data processing device 10 of Embodiment 2. The asynchronous transfer circuit 1 includes a bridge circuit BRA on a body side [RA] and a bridge circuit BCA on a check side [CA] which are duplicated in the ACLK domain, a bridge circuit BRB on a body side [RB] and a bridge circuit BCB on a check side [CB] which are duplicated in the BCLK domain, flip-flops 3_AB and 3_BA, and comparison circuits 2_3 and 2_4, which are not to be duplicated. Further, the flip-flop 4_R, the combination circuit 5_R, the flip-flop 4_C, and the combination circuit 5_C are included in the bridge circuit BRB on the body side [RB] and the bridge circuit BCB on the check-side [CB], respectively, and are duplicated in the BCLK domain. Since the configuration and operation are the same as the asynchronous transfer circuit 1 illustrated in FIG. 8, the description thereof will be omitted. The asynchronous transfer circuit 1 of another configuration example illustrated in FIG. 9 further includes delay circuits 6_5, 6_6, 6_8, and 6_9.

In the ACLK domain, the delay circuit 6_5 receives the control signal CsRAB which is output from the bridge circuit BRA on the body side [RA], delays it by a predetermined number of cycles, and outputs the delayed signal to the comparison circuit 2_3. The delay circuit 6_6 receives the control signal CsRBA which is transferred from the BCLK domain and received from the flip-flop 3_BA, delays it by the predetermined number of cycles, and outputs the delayed signal as a control signal CsCBA to the bridge circuit BRA on the check side [CA].

In the BCLK domain, the delay circuit 6_8 receives the control signal CsRBA which is output from the bridge circuit BRB on the body side [RB], delays it by a predetermined number of cycles, and outputs the delayed signal to the comparison circuit 2_4. The delay circuit 6_9 receives the control signal CsRAB which is transferred from the ACLK domain and received from the flip-flop 3_AB, delays it by the predetermined number of cycles, and outputs the delayed signal as a control signal CsCAB to the bridge circuit BRB on the check side [CB].

The delay circuits 6_5 and 6_6 can be respectively configured with a flip-flop of one to several stages, and uniformly delay the operations of the circuit and bridge circuit BCA on the check side [CA] in the ACLK domain by one to several number of clock cycles with respect to the operations of the circuits and bridge circuit BRB on the body side [RB]. The delay circuits 6_8 and 6_9 can be respectively configured with a flip-flop of one to several stages, and uniformly delay the operations of the circuit and bridge circuit BCB on the check side [CB] in the BCLK domain by one to several number of clock cycles with respect to the operations of the circuits and bridge circuit BRA on the body side [RA]. The delay rate (the number of cycles) by the delay circuits 6_5 and 6_6 and the delay rate (the number of cycles) by the delay circuits 6_8 and 6_9 do not need to be the same.

Thus, as illustrated in Embodiment 2, it is possible to improve reliability, by also applying the duplication type in which the same data processing is executed with a constant time difference (the number of cycles) to in the data processing device 10 in which payload signals PR and PC are duplicated.

Embodiment 3

<Duplication of Payload Signal and Control Signal>

In Embodiment 1, since the control signals CsAB and CsBA and the payload signal P are not duplicated in the interface between the ACLK domain and the BCLK domain in the asynchronous transfer circuit 1, this enables the asynchronous transfer between the respective duplicated circuits in the asynchronous clock domains. In Embodiment 2, it is possible to further improve the reliability by duplicating the payload signal P in the interface between the ACLK domain and the BCLK domain in the asynchronous transfer circuit 1. In Embodiment 3, it is possible to further improve the reliability by further duplicating the control signals CsAB and CsBA.

Figure 10:
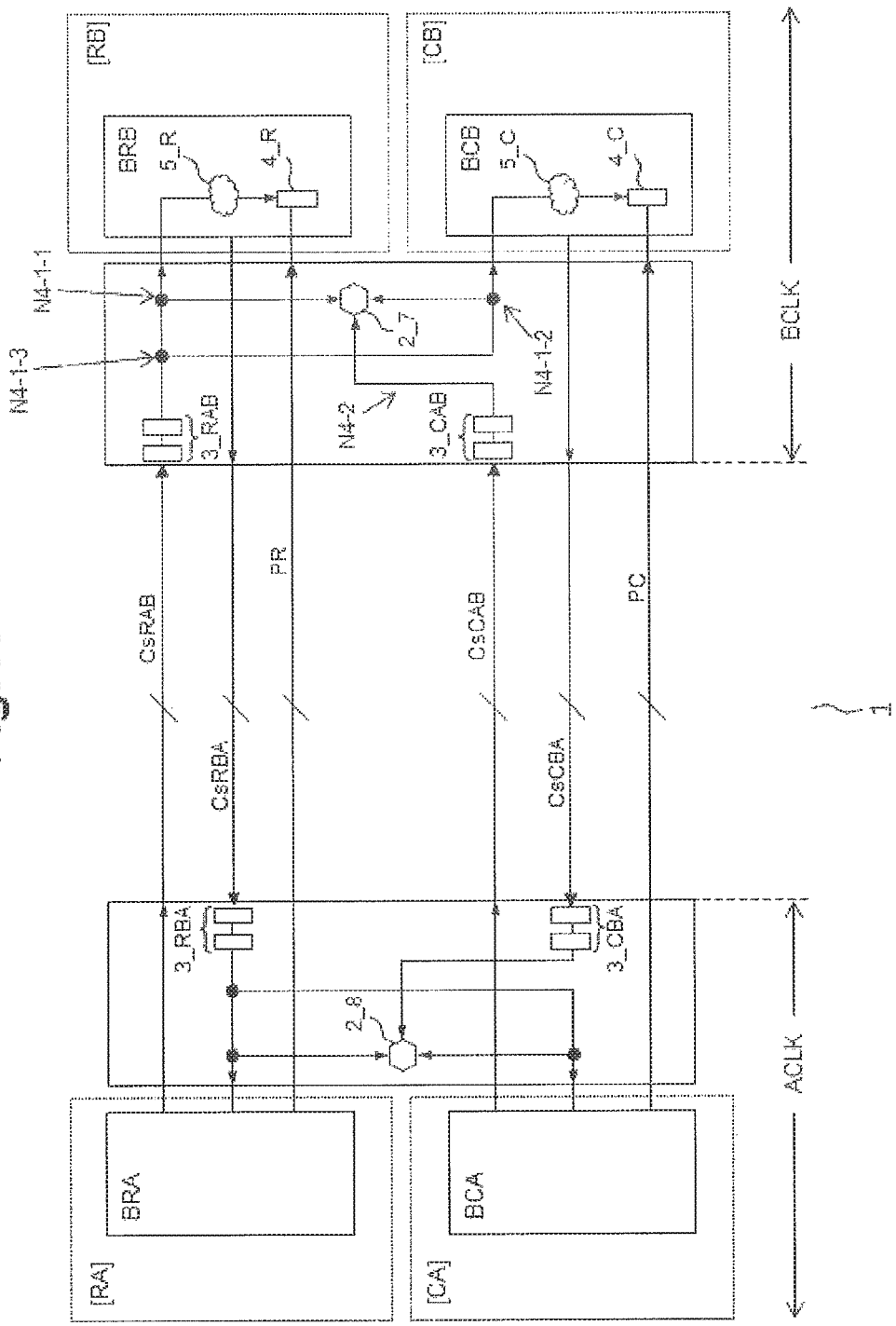
FIG. 10 is a block diagram illustrating a configuration example of an asynchronous transfer circuit included in a data processing device of Embodiment 3.

FIG. 10 is a block diagram illustrating a configuration example of an asynchronous transfer circuit 1 included in a data processing device 10 of Embodiment 3. The asynchronous transfer circuit 1 includes a bridge circuit BRA on a body side [RA] and a bridge circuit BCA on a check side [CA] which are duplicated in the ACLK domain, and a bridge circuit BRB on a body side [RB] and a bridge circuit BCB on a check side [CB] which are duplicated in the BCLK domain. Since the configuration and operation are the same as the asynchronous transfer circuits 1 illustrated in FIG. 4 and FIG. 6, the description thereof will be omitted. In Embodiment 3, since the control signal is also duplicated in addition to the payload signal, the payload signal PR and the control signals CsRAB and CsRBA on the body side [RA] are duplicated into the payload signal PC and the control signals CsCAB and CsCBA on the check side [CA]. Along with this, in the BCLK domain, the flip-flops 3_RAB and 3_CAB that respectively receive the control signals CsRAB and CsCAB are duplicated, the flip-flops 4_R and 4_C that respectively receive the payload signals PR and PC and the combination circuits 5_R and 5_C that respectively provide the acquisition timings are respectively duplicated. The asynchronous transfer circuit 1 further includes comparison circuits 2_7 and 2_8.

Even if the control signals CsRAB and CsCAB are control signals which transition at the same timing, but the timings at which they are received by the flip-flops 3_RAB and 3_CAB are not necessarily limited to the same timing. This is as mentioned in "problems to be solved". Thus, only a signal from the flip-flop 3_RAB that receives the body-side control signal CsRAB is supplied to both the combination circuits 5_R and 5_C in order to generate timings to receive the payload signals PR and PC, and a signal from the flip-flop 3_CAB that receives the check-side control signal CsCAB is not supplied to the combination circuit 5_C, for use comparison with the body-side signal.

The comparison circuit 2_7 compares the signal from the flip-flop 3_RAB that receives the body-side control signal CsRAB with the signal from the flip-flop 3_CAB that receives the check-side control signal CsCAB, and in a case of mismatch, it notifies the error management circuit EML of a failure, or allows shift of one cycle. Since the shift of one cycle is likely to occur even if there is no failure in principle, the shift is allowed to avoid a problem that a process coping with the failure is activated also in a case where there is no failure when comparing strictly.

The comparison circuit 2_7 is able to compare three inputs which are a signal of a node N4-1-1 which is input to the combination circuit 5_R, a signal of a node N4-1-2 which is input to the combination circuit 5_C, among the signals from the flip-flop 3_RAB that receives the body-side control signal CsRAB, and a signal of a node N4-2 which is at the path from the flip-flop 3_CAB that receives the check-side control signal CsCAB. The comparison between the node N4-1-1 and the node N4-2, and the comparison between the node N4-1-2 and the node N4-2 perform comparison of match/mismatch while allowing shift of one cycle, and the comparison between the node N4-1-1 and the node N4-1-2 performs comparison of match/mismatch without allowing shift of one cycle, and in a case where any one of nodes is different from other nodes, mismatch is detected, and the error management circuit EML (not illustrated) is notified of the mismatch.

The shift of one cycle is likely to occur between the signal from the flip-flop 3_RAB that receives the body-side control signal CsRAB and the signal from the flip-flop 3_CAB that receives the check-side control signal CsCAB. However, since only the body-side control signal CsRAB is used for generation of the acquisition timings of the payload signals PR and PC, as long as there is no failure, the cycle shift does not occur in the acquisition timing. Although the signal from the flip-flop 3_CAB that receives the check-side control signal CsCAB is used for comparison with the signals from the body side, the shift of one cycle which may occur is handled by the comparison circuit 2_7, thereby allowing an erroneous detection of a failure to be avoided.

In the ACLK domain, the shift of one cycle is likely to occur between the signal from the flip-flop 3_RBA that receives the body-side control signal CsRBA and the signal from the flip-flop 3_CBA that receives the check-side control signal CsCBA. However, since the signal from the flip-flop 3_RBA that receives the body-side control signal CsRBA is input to the body-side bridge circuit BRA and the check-side bridge circuit BCA, cycle shift does not occur in the operations of the body-side bridge circuit BRA and the check-side bridge circuit BCA and the operation of the body-side circuit and the check-side circuit in the subsequent stage, as long as there is no failure. Although the signal from the flip-flop 3_CBA that receives the check-side control signal CsCBA is used for comparison with the signal from the body side, the shift of one cycle which may occur is handled by the comparison circuit 2_8, thereby allowing an erroneous detection of a failure to be avoided.

Thus, in the asynchronous transfer circuit 1, the payload signal and the control signal are duplicated, and it is possible to further improve reliability than the case of Embodiment 2.

<Duplication Type Executed with a Constant Time Difference>

Figure 11:
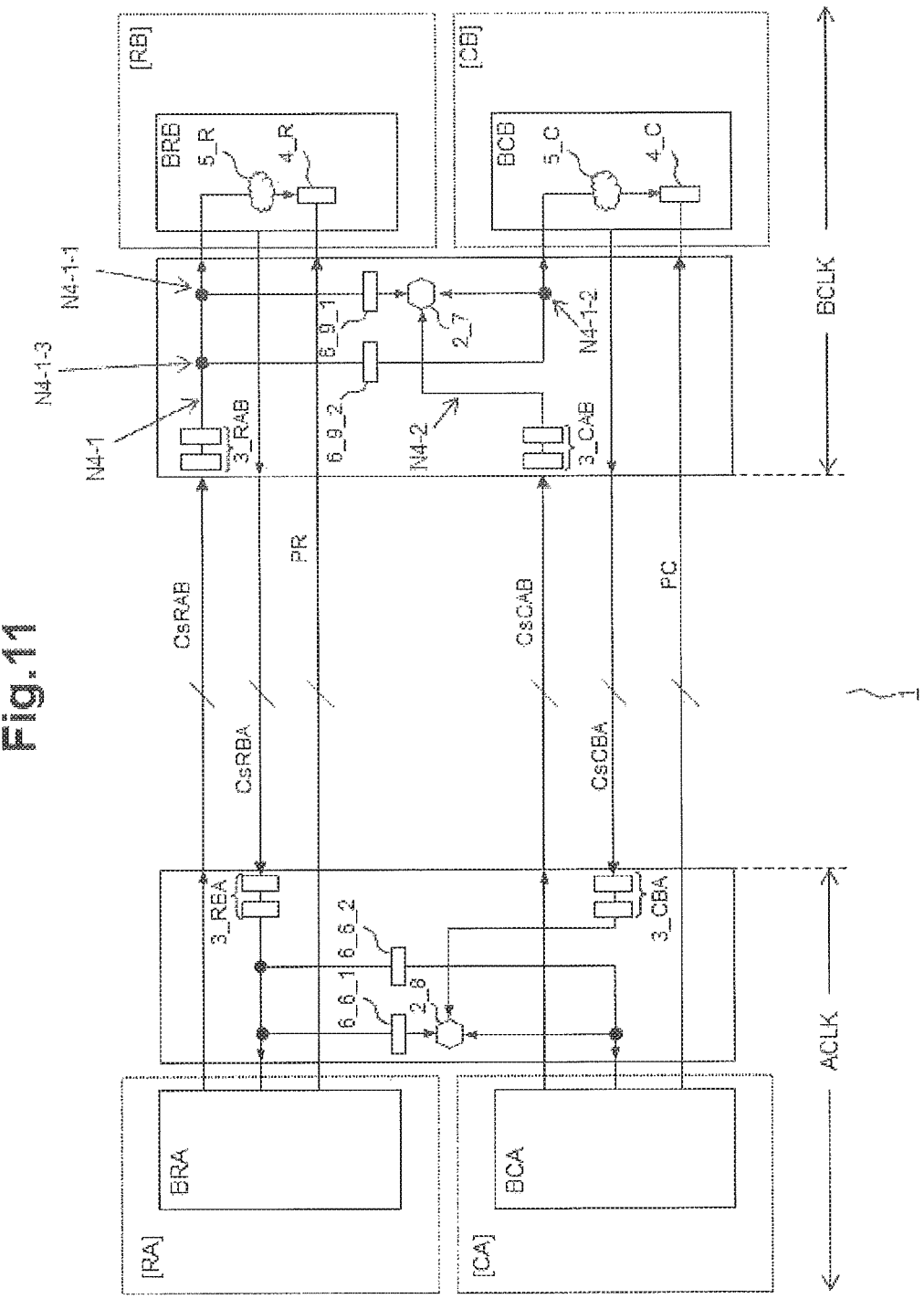
FIG. 11 is a block diagram illustrating another configuration example of the asynchronous transfer circuit included in the data processing device of Embodiment 3.

FIG. 11 is a block diagram illustrating another configuration example of the asynchronous transfer circuit 1 included in the data processing device 10 of Embodiment 3. The asynchronous transfer circuit 1 includes a bridge circuit BRA on a body side [RA], a bridge circuit BCA on a check side [CA], and flip-flops 3_RBA and 3_CBA, which are duplicated in the ACLK domain, a bridge circuit BRB on a body side [RB], a bridge circuit BCB on a check side [CB], and flip-flops 3_RAB and 3_CAB, which are duplicated in the BCLK domain, and comparison circuits 2_7 and 2_8. Further, the flip-flop 4_R, the combination circuit 5_R, the flip-flop 4_C, and the combination circuit 5_C are included in the bridge circuit BRB on the body side [RB] and the bridge circuit BCB on the check side [CB], respectively, and are duplicated in the BCLK domain. Since the configuration and operation are the same as in the asynchronous transfer circuit 1 illustrated in FIG. 10, the description thereof will be omitted. The asynchronous transfer circuit 1 of another configuration example illustrated in FIG. 9 further includes delay circuits 6_6_1, 6_6_2, 6_9_1, and 6_9_2.

In the ACLK domain, the check-side [CA] circuit LCA (not illustrated) and the bridge circuit BCA operate with a time difference (shift) of a constant cycle (a single to a plurality of cycles) from the body-side [RA] LRA (not illustrated) and the bridge circuit BRA, and the delay circuits 6_6_1, 6_6_2 are delay circuits that give delay of the constant cycle. In the BCLK domain, the check-side [CB] circuit LCB (not illustrated) and the bridge circuit BCB operate with a time difference (shift) of a constant cycle (a single to a plurality of cycles) from the body-side [RB] LRB (not illustrated) and the bridge circuit BRB, and the delay circuits 6_9_1, 6_9_2 are delay circuits that give delay of the constant cycle.

In the ACLK domain, the delay circuits 6_6_1 and 6_6_2 receive the control signal CsRBA which is transferred from the BCLK domain and received from the flip-flop 3_RBA, the delay circuit 6_6_1 delays the control signal by the constant number of cycles, and inputs the delayed signal to the comparison circuit 2_8, and the delay circuit 6_6_2 delays the control signal by the constant number of cycles and inputs the delayed signal to the comparison circuit 2_8, similarly, as well as to the bridge circuit BCA.

In the BCLK domain, the delay circuits 6_9_1 and 6_9_2 receive the control signal CsRAB which is transferred from the ACLK domain and received by the flip-flop 3_RAB. The delay circuit 6_9_1 delays the control signal by the constant number of cycles and inputs the delayed control signal to the comparison circuit 2_7, and the delay circuit 6_9_2 delays the control signal by the constant number of cycles and inputs the delayed control signal to the comparison circuit 2_7, similarly, as well as to the combination circuit 5_C of the bridge circuit BCB.

Thus, even in the duplication type in which the same data processing is executed with a constant time difference (the number of cycles), it is possible to properly detect failure.

Embodiment 4

Figure 12:
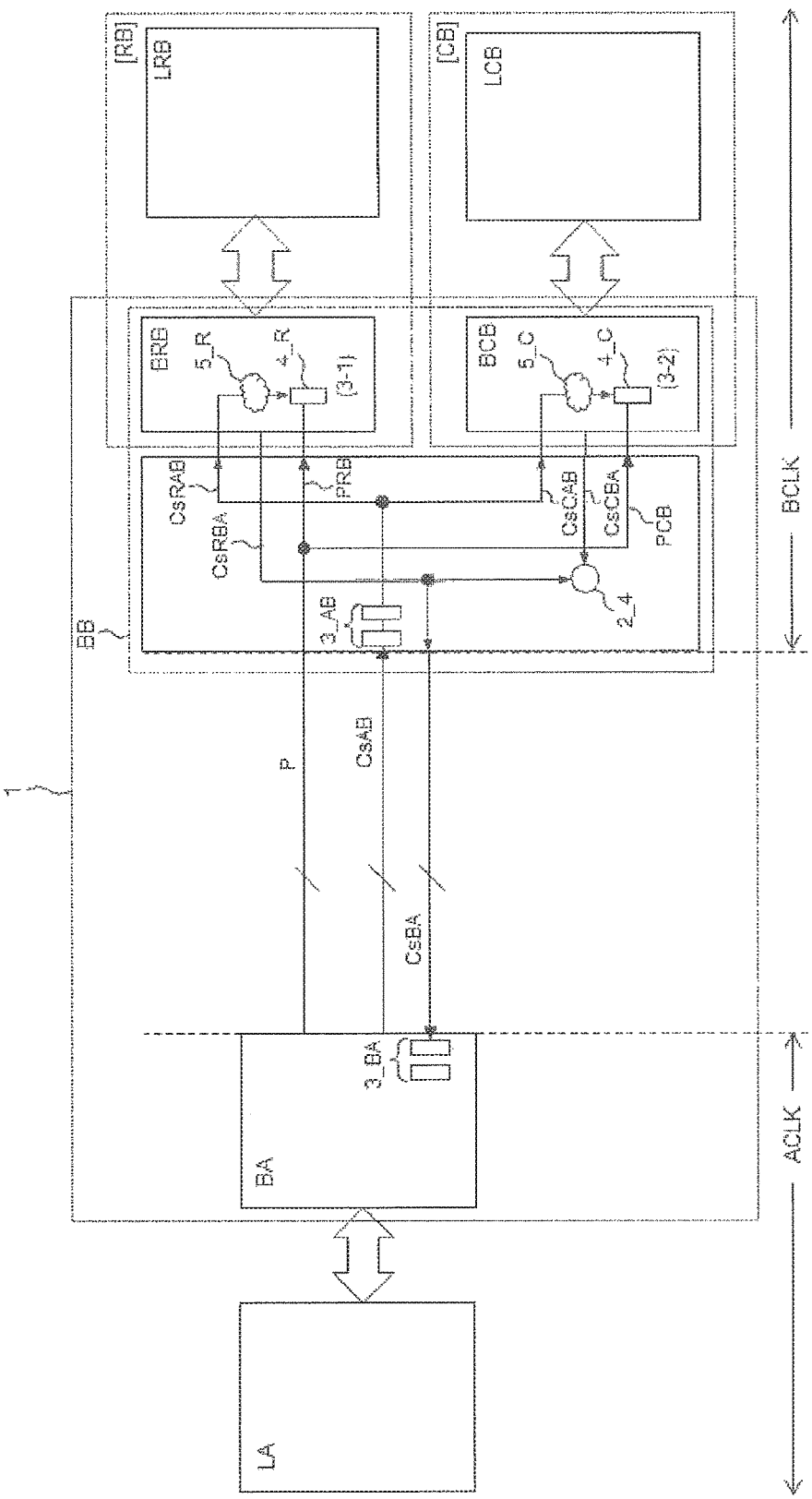
FIG. 12 is a block diagram illustrating a first configuration example of a data processing device of Embodiment 4.
Figure 13:
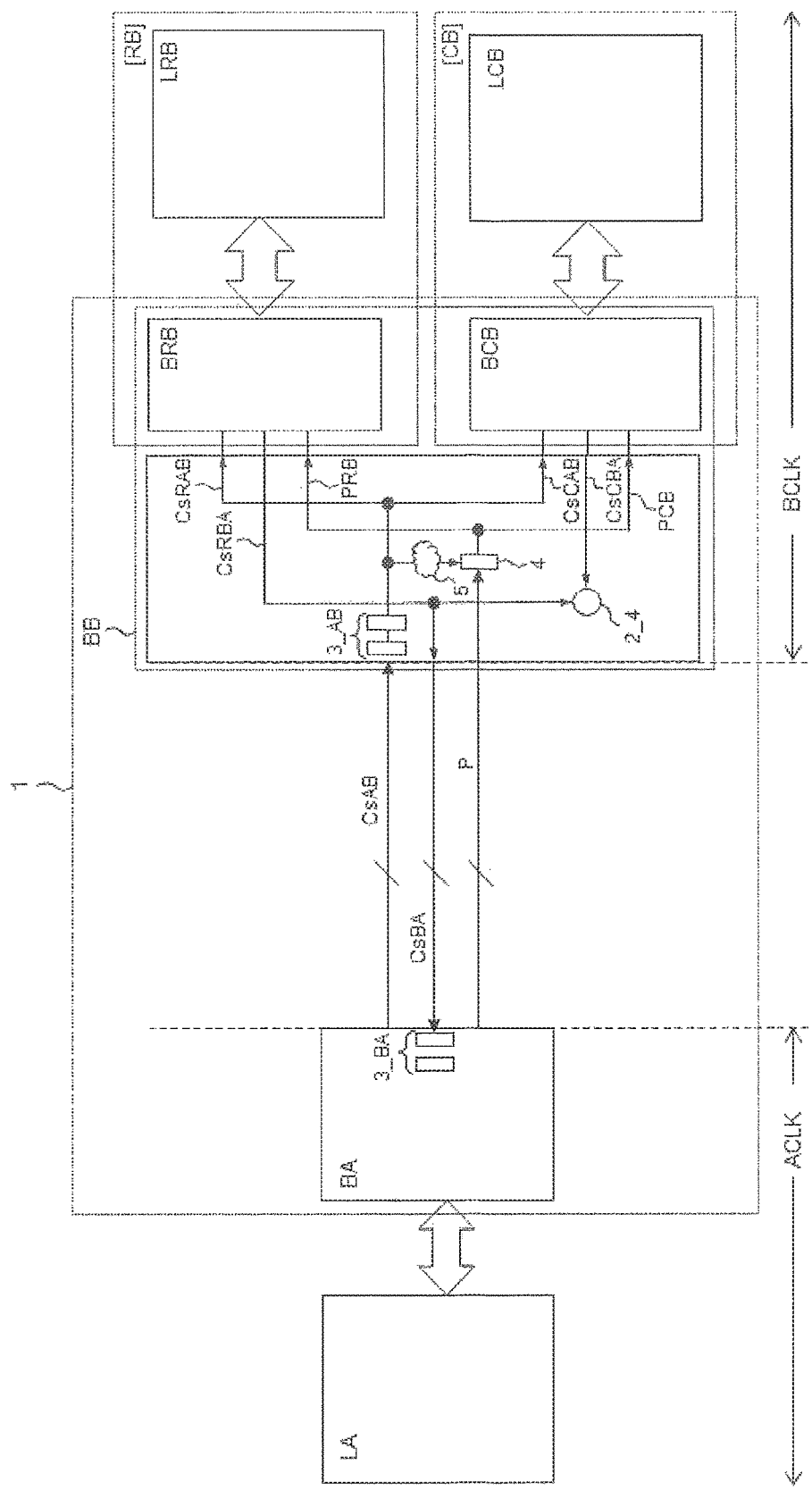
FIG. 13 is a block diagram illustrating a second configuration example of the data processing device of Embodiment 4.
Figure 14:
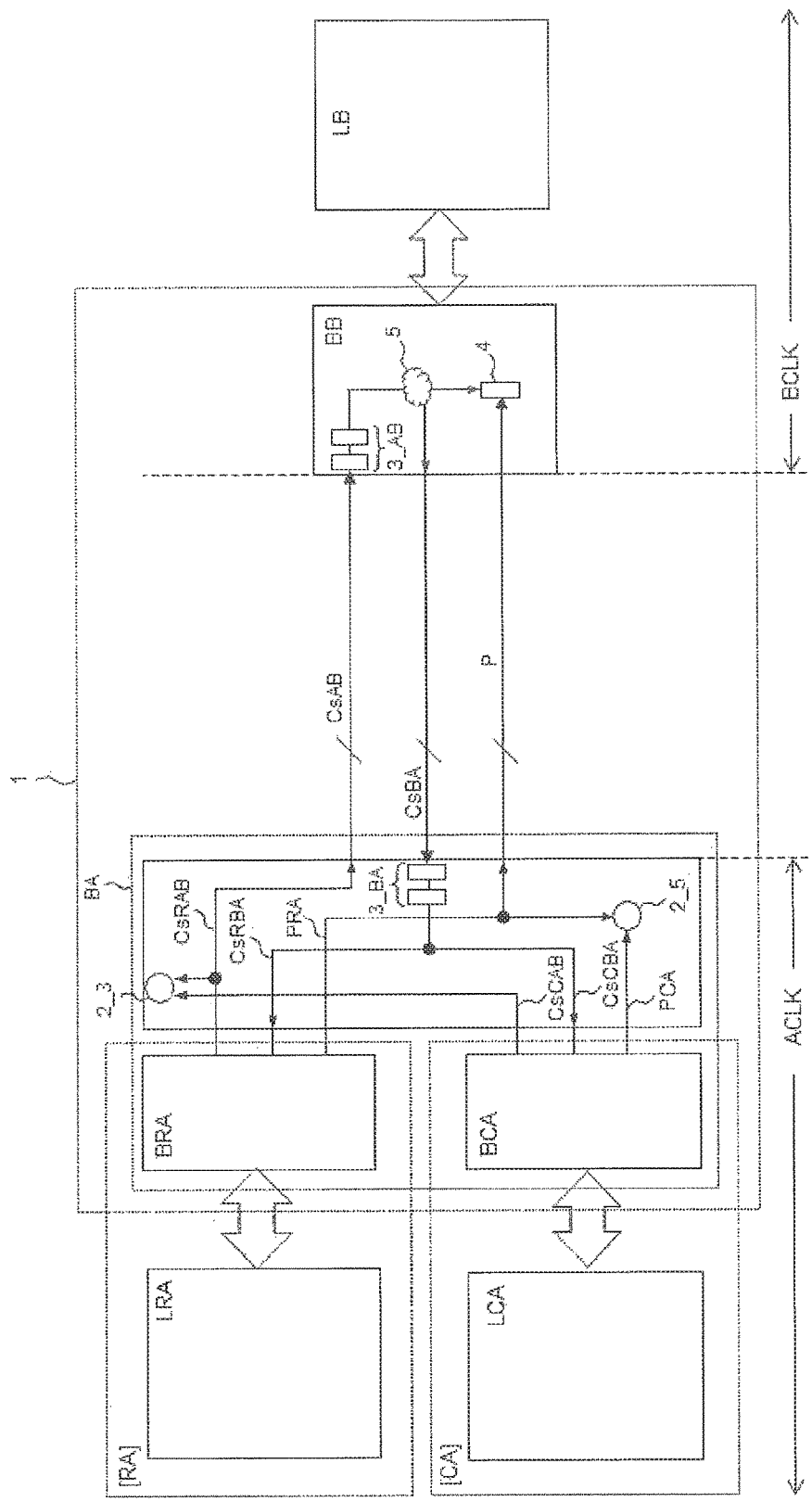
FIG. 14 is a block diagram illustrating a third configuration example of the data processing device of Embodiment 4.

Whereas the circuit in the ACLK domain and the circuit in the BCLK domain are respectively duplicated in Embodiments 1 to 3, only one of them is duplicated assuming a situation in which the safety of one of the circuit is ensured by different means in Embodiment 4. Here, the different means for ensuring the safety is, for example, a failure test of a circuit such as a recurring scan test. FIG. 12 and FIG. 13 illustrate an asynchronous transfer circuit 1 that asynchronously transfers the payload signal from a side which is not duplicated to a side which is duplicated, and FIG. 14 illustrates an asynchronous transfer circuit 1 that asynchronously transfers the payload signal from a side which is duplicated to a side which is not duplicated conversely. In addition, it is possible to make the same configuration as of the circuits disclosed in Embodiments 1 to 3 by replacing the circuit which is not duplicated with the circuit which is duplicated.

<Asynchronous Transfer to Duplicated Circuits from Another Circuit>

FIG. 12 is a block diagram illustrating a first configuration example of the data processing device 10 of Embodiment 4.

The data processing device 10 is configured to include a logic circuit LA that operates in the ACLK domain, a body-side [RB] circuit LRB and a check-side [CB] circuit LCB which are duplicated to each other in the BCLK domain, and an asynchronous transfer circuit 1. The asynchronous transfer circuit 1 includes a bridge circuit BA that is connected to the logic circuit LA and operates in the ACLK domain, and a bridge circuit BB that operates in the BCLK domain. The bridge circuit BB includes a flip-flop 3_AB and a comparison circuit 2_4, which are not respectively duplicated, and bridge circuits BRB and BCB which are respectively connected to the body-side [RB] circuit LRB and the check-side [CB] circuit LCB and operate in a duplicated mode. The bridge circuits BRB and BCB include flip-flops 4_R and 4_C which respectively receive the payload signal P, and combination circuits 5_R and 5_C which generate an acquisition timing to be provided to the flip-flops. The combination circuits 5_R and 5_C are duplicated circuits which perform the same process.

The payload signal P and the control signal CsAB are transmitted from the logic circuit LA that operates in the ACLK domain, through the bridge circuit BA, and the bridge circuit BA includes a flip-flop circuit 3_BA, and receives a control signal CsBA which is transferred from the BCLK domain.

A control signal CsAB is received by the flip-flop 3_AB which is not duplicated, in the BCLK domain, is input to the body-side [RB] bridge circuit BRB, and is also input to the check-side [CB] bridge circuit BCB in parallel. Since the control signal is a single signal, even if it is input to the bridge circuits BRB and BCB respectively, a time difference (a cycle difference) does not occur. As long as there is no failure, the combination circuits 5_R and 5_C provide the same acquisition timing to the flip-flops 4_R and 4_C, and the flip-flops 4_R and 4_C receive the payload signal P which is not duplicated. Since the payload signal P which is not duplicated is acquired at the same acquisition timing, cycle shift does not occur in the payload signal which is received by the flip-flops 4_R and 4_C.

The control signal CsRBA which is output by the body-side [RB] bridge circuit BRB and the control signal CsCBA which is output by the check-side [CB] bridge circuit BCB are input to and compared by the comparison circuit 2_4, and in the case of mismatch, the error management circuit EML (not illustrated) is notified of the mismatch. The control signal CsRBA of the body-side [RB] is transferred to the ACLK domain as the control signal CsBA, and is input to the flip-flop circuit 3_BA of the bridge circuit BA.

FIG. 13 is a block diagram illustrating a second configuration example of the data processing device 10 of Embodiment 4.

The data processing device 10 is configured to include a logic circuit LA that operates in the ACLK domain, a body-side [RB] circuit LRB and a check-side [CB] circuit LCB which are duplicated to each other in the BCLK domain, and an asynchronous transfer circuit 1. The asynchronous transfer circuit 1 includes a bridge circuit BA that is connected to the logic circuit LA and operates in the ACLK domain, and a bridge circuit BB that operates in the BCLK domain. The bridge circuit BB includes flip-flops 3_AB and 4, a combination circuit 5, and a comparison circuit 2_4, which are not respectively duplicated, and bridge circuits BRB and BCB which are respectively connected to the body-side [RB] circuit LRB and the check-side [CB] circuit LCB and operate in a duplicated mode.

The payload signal P and the control signal CsAB are transmitted from the logic circuit LA that operates in the ACLK domain, through the bridge circuit BA, and the bridge circuit BA includes a flip-flop circuit 3_BA, and receives a control signal CsBA which is transferred from the BCLK domain. A control signal CsAB is received by the flip-flop 3_AB which is not duplicated, in the BCLK domain, is input to the combination circuit 5 and the body-side [RB] bridge circuit BRB, and is also input to the check-side [CB] bridge circuit BCB in parallel. The combination circuit 5 provides an acquisition timing of the payload signal P to the flip-flop 4, and the payload signal P which is received by the flip-flop 4 is input to the bridge circuits BRB and BCB respectively, as the payload signals PRB and PCB. Since the control signal is a single signal which is originally not duplicated, even if it is input to the bridge circuits BRB and BCB respectively, a time difference (a cycle difference) does not occur in principle.

The control signal CsRBA which is output by the body-side [RB] bridge circuit BRB and the control signal CsCBA which is output by the check-side [CB] bridge circuit BCB are input to and compared by the comparison circuit 2_4, and in the case of mismatch, the error management circuit EML (not illustrated) is notified of the mismatch. The control signal CsRBA of the body-side [RB] is transferred to the ACLK domain as the control signal CsBA, and is input to the flip-flop circuit 3_BA of the bridge circuit BA.

As described above with reference to FIG. 12 and FIG. 13, in a case where the duplicated circuits receive the payload signal in the asynchronous transfer between the duplicated circuits and the circuit which operates asynchronously to the duplicated circuits (irrespective of whether it is duplicated or not), it is possible to improve the reliability of the asynchronous transfer circuit, and achieve both high performance and reliability. This is because the body-side [RB] bridge circuit BRB and the check-side [CB] bridge circuit BCB, which are a portion of the asynchronous transfer circuit, are duplicated to each other.

<Asynchronous Transfer from Duplicated Circuits to Another Circuit>

FIG. 14 is a block diagram illustrating a third configuration example of the data processing device 10 of Embodiment 4.

The data processing device 10 is configured to include a body-side [RA] circuit LRA and a check-side [CA] circuit LCA which are duplicated to each other in an ACLK domain, a logic circuit LB that operates in a BCLK domain, and an asynchronous transfer circuit 1. The asynchronous transfer circuit 1 includes a bridge circuit BA that operates in the ACLK domain, and a bridge circuit BB that is connected to the logic circuit LB and operates in the BCLK domain. The bridge circuit BA includes a flip-flop 3_BA and comparison circuits 2_3 and 2_5, which are not respectively duplicated, and includes bridge circuits BRA and BCA which are respectively connected to the body-side [RA] circuit LRA and the check-side [CA] circuit LCA and operate in a duplicated mode. The bridge circuits BRA and BCA respectively output control signals CsRAB and CsCAB, and payload signals PRA and PCA, and receive control signals CsRBA and CsCBA. The control signals CsRAB and CsCAB are input to the comparison circuit 2_3, the payload signals PRA and PCA are input to the comparison circuit 2_5, and in a case where mismatch is detected in one or both comparison circuits, an error management circuit EML (not illustrated) is notified of the mismatch. The control signal CsRBA as a control signal CsAB and the payload signal PRA as a payload signal P are transferred to the BCLK domain.

The bridge circuit BB is configured to include flip-flops 3_AB and 4, and a combination circuit 5. The control signal CsAB which is transferred from the ACLK domain is received by the flip-flop 3_AB and is supplied to the combination circuit 5. The combination circuit 5 generates and transmits a signal CsBA which is to be output to the ACLK domain, and supplies a timing to acquire the payload signal P to the flip-flop 4.

Since the BCLK domain to which the payload signal P is transferred is not duplicated, a problem of cycle shift does not occur at all, but the bridge circuits BRA and BCA of the ACLK domain which transmit the payload signal P are duplicated, thereby enabling the improvement of reliability.

<Duplication Type Executed with a Constant Time Difference>

It is possible to change the data processing devices 10 according to Embodiment 4 which has been described with reference to FIGS. 12 to 14 such that the same data processing is executed with a constant time difference (the number of cycles) in the pair of duplicated circuits, by properly inserting the delay circuit 6, according to the same way of consideration as in FIGS. 7, 9, and 11.

Hitherto, the invention made by the present inventors has been specifically described based on the embodiments, but the present invention is not limited thereto, and various modifications are possible within a scope without departing from the spirit.

For example, it is possible to add a transfer circuit of other payload signals having different transfer direction and transfer timing, to the asynchronous transfer circuit. Division into the blocks of the body-side circuit and the bridge circuit connected thereto, and the check-side circuit and the bridge circuit connected thereto is made in terms of convenience, and can be changed in appropriate.

INDUSTRIAL APPLICABILITY

The present invention can be widely applied to a data processing device including logic circuits which are duplicated for functional safety and an asynchronous data transfer circuit which is provided between the logic circuits and different logic circuits which operate asynchronously to the logic circuits.

EXPLANATION OF REFERENCE NUMERALS

1 ASYNCHRONOUS TRANSFER CIRCUIT
2_1 TO 2_8 COMPARISON CIRCUIT
3_AB, 3_BA, 3_RAB, 3_RBA, 3_CAB, 3_CBA FLIP-FLOP
4, 4_R, 4_C FLIP-FLOP
5, 5_R, 5_C COMBINATION CIRCUIT
6_1 TO 6_10 DELAY CIRCUIT (FLIP-FLOP OF A PREDETERMINED NUMBER OF STAGES FOR SHIFTING THE CHECK-SIDE OPERATION BY A PREDETERMINED NUMBER OF CYCLES)
10 DATA PROCESSING DEVICE
LA, LB, 7_1 TO 7_5 LOGIC CIRCUIT
LR, LRA, LRB BODY CIRCUIT (R: Reference)
LC, LCA, LCB CHECK CIRCUIT (C: Checker)
BA, BB BRIDGE CIRCUIT
BRA, BRB BODY-SIDE BRIDGE CIRCUIT
BCA, BCB CHECK-SIDE BRIDGE CIRCUIT
P, PR, PC PAYLOAD SIGNAL
CsAB, CsBA, CsRAB, CsRBA, CsCAB, CsCBA ASYNCHRONOUS TRANSFER CONTROL SIGNAL
EML ERROR MANAGEMENT CIRCUIT (Error Management Logic)

What is claimed is:

1. A data processing device comprising:
a first body circuit and a first check circuit which are duplicated to each other in a first clock domain;
a second body circuit and a second check circuit which are duplicated to each other in a second clock domain which is asynchronous to the first clock domain; and
an asynchronous transfer circuit that transfers a payload signal between the first clock domain and the second clock domain,
wherein the asynchronous transfer circuit
includes a first body-side bridge circuit and a first check-side bridge circuit which are respectively connected to the first body circuit and the first check circuit and are duplicated to each other in the first clock domain, and a second body-side bridge circuit and a second check-side bridge circuit which are respectively connected to the second body circuit and the second check circuit and are duplicated to each other in the second clock domain, and
has control signals which are generated by first or second body-side bridge circuit which transmits the payload signal and indicate a timing at which the payload signal is stable on a reception side, compares the control signal and check control signal which are generated by the corresponding first or second check-side bridge circuit, and in a case of mismatch, detects as a failure.

2. The data processing device according to claim 1,
wherein the first body circuit and the first check circuit respectively perform the same data processing with a time difference of a first number of cycles of 0 or more cycles in the first clock domain,
wherein the second body circuit and the second check circuit respectively perform the same data processing with a time difference of a second number of cycles of 0 or more cycles in the second clock domain,
wherein the asynchronous transfer circuit compares an output from the first body circuit and an output from the first check circuit with a time difference of the first number of cycles in the first clock domain, and in a case of mismatch, detects as a failure, and
wherein the comparison between the control signal and the corresponding check control signal is performed with a time difference of the first number of cycles in the first clock domain, and the comparison is performed with a time difference of the second number of cycles in the second clock domain.

3. The data processing device according to claim 1,
wherein the first body-side bridge circuit transfers the payload signal and the control signals to the second body-side bridge circuit,
wherein the first check-side bridge circuit generates a check payload signal and the check control signals, and transfers the check payload signal to the second check-side bridge circuit,
wherein the asynchronous transfer circuit compares the control signal and the check control signal in the first clock domain, and in a case of mismatch, detects as a failure,
wherein the asynchronous transfer circuit transfers the control signal to the second clock domain, and
wherein based on the control signal which is transferred to the second clock domain, the second body-side bridge circuit receives the payload signal, the second check-side bridge circuit receives the check payload signal, and the asynchronous transfer circuit compares the payload signal and the check payload signal which are respectively received by the second body-side bridge circuit and the second check-side bridge circuit, and in a case of mismatch, detects as a failure.

4. The data processing device according to claim 3,
wherein the first body circuit and the first check circuit respectively perform the same data processing with a time difference of a first number of cycles of 0 or more cycles in the first clock domain,
wherein the second body circuit and the second check circuit respectively perform the same data processing with a time difference of a second number of cycles of 0 or more cycles in the second clock domain,
wherein the asynchronous transfer circuit compares an output from the first body circuit and an output from the first check circuit with a time difference of the first number of cycles in the first clock domain, and in a case of mismatch, detects as a failure,
wherein the comparison between the control signal and the corresponding check control signal is performed with a time difference of the first number of cycles in the first clock domain, and
wherein the comparison between the payload signal and the check payload signal is performed with a time difference of the second number of cycles in the second clock domain.

5. The data processing device according to claim 1,
wherein the first body-side bridge circuit transfers the payload signal and the control signals to the second body-side bridge circuit,
wherein the first check-side bridge circuit generates the check payload signal and the check control signal, and transfers the check payload signal and the check control signal to the second check-side bridge circuit,
wherein the asynchronous transfer circuit compares the control signal and the check control signal in the second clock domain while allowing shift up to one cycle, and in a case of mismatch, detects as a failure, and
wherein based on the control signal which is transferred to the second clock domain, the second body-side bridge circuit receives the payload signal, the second check-side bridge circuit receives the check payload signal, and the asynchronous transfer circuit compares the payload signal and the check payload signal which are respectively received by the second body-side bridge circuit and the second check-side bridge circuit, and in a case of mismatch, detects as a failure.

6. The data processing device according to claim 5,
wherein the first body circuit and the first check circuit respectively perform the same data processing with a time difference of a first number of cycles of 0 or more cycles in the first clock domain,
wherein the second body circuit and the second check circuit respectively perform the same data processing with a time difference of a second number of cycles of 0 or more cycles in the second clock domain,
wherein the asynchronous transfer circuit compares the output from the first body circuit and the output from the first check circuit with a time difference of the first number of cycles in the first clock domain, and in a case of mismatch, detects as a failure,
wherein the comparison between the control signal and the corresponding check control signal is performed in the second clock domain with a time difference obtained by adding a margin of plus or minus one cycle to the second number of cycles, if the signals match within the time difference including the margin, it is determined to match, and in a case of mismatch within a range of the margin, it is detected as a failure, and
wherein the comparison between the payload signal and the check payload signal is performed with a time difference of the second number of cycles in the second clock domain.

7. The data processing device according to claim 5,
wherein the second body-side bridge circuit includes a second body-side flip-flop that receives the payload signal,
wherein the second check-side bridge circuit includes a second check-side flip-flop that receives the check payload signal, and
wherein the asynchronous transfer circuit compares three signals which are a signal for providing an acquisition timing of the payload signal to the second body-side flip-flop based on the control signal, a signal for providing an acquisition timing of the check payload signal to the second check-side flip-flop based on the control signal, and the check control signal, and in a case where at least one signal does not match the other signals, detects as a failure.

8. The data processing device according to claim 7,
wherein the first body circuit and the first check circuit respectively perform the same data processing with a time difference of a first number of cycles of 0 or more cycles in the first clock domain,
wherein the second body circuit and the second check circuit respectively perform the same data processing with a time difference of a second number of cycles of 0 or more cycles in the second clock domain,
wherein the asynchronous transfer circuit compares the output from the first body circuit and the output from the first check circuit with a time difference of the first number of cycles in the first clock domain, and in a case of mismatch, detects as a failure,
wherein based on the control signal, the comparison between the signal for providing an acquisition timing of the payload signal to the second body-side flip-flop and the corresponding check control signal is performed in the second clock domain with a time difference obtained by adding a margin of plus or minus one cycle to the second number of cycles, it is determined to match if the signals match within the time difference including the margin, and in a case of mismatch within a range of the margin, it is detected as a failure,
wherein based on the control signal, the comparison between the signal for providing an acquisition timing of the check payload signal to the second check-side flip-flop and the corresponding check control signal is performed in the second clock domain, if the signals match within the time difference of plus or minus one cycle, it is determined to match, and in a case of mismatch within a range of plus or minus one cycle, it is detected as a failure, and
wherein the comparison between the payload signal and the check payload signal is performed with a time difference of the second number of cycles in the second clock domain.

9. The data processing device according to claim 1, further comprising:
an error management circuit which is notified of the detection of failure.

10. The data processing device according to claim 1,
wherein the first body circuit and the first check circuit are CPUs having the same circuit configuration capable of respectively executing the same program, and wherein the second body circuit and the second check circuit are bus bridges each having the same circuit configuration.

11. The data processing device according to claim 1, wherein the data processing device is formed on a single semiconductor substrate.

12. A data processing device comprising:
a first body circuit and a first check circuit which operate in synchronization with a first clock, and are duplicated to each other so as to respectively perform the same processing;
a second circuit which operates in synchronization with a second clock which is asynchronous to the first clock; and
an asynchronous transfer circuit that performs asynchronous transfer of a payload signal, between the first body circuit and the first check circuit, and the second circuit,
wherein the asynchronous transfer circuit includes a first bridge circuit which operates in synchronization with the first clock and is connected to the first body circuit and the first check circuit, and a second bridge circuit which operates in synchronization with the second clock and is connected to the second circuit, and the first bridge circuit and the second bridge circuit are connected with each other through the payload signal and an asynchronous transfer control signal indicating a timing at which the payload signal is stable on the reception side,
wherein the first bridge circuit includes a first body-side conversion circuit that converts input and output signals to and from the first body circuit into a first body-side payload signal and first body-side asynchronous transfer control signals, a first check-side conversion circuit that converts input and output signals to and from the first check circuit into a first check-side payload signal and first check-side asynchronous transfer control signals, and a first comparison circuit that compares an output signal to be transmitted to the second bridge circuit among the first body-side asynchronous transfer control signals and the corresponding output signal among the first check-side asynchronous transfer control signals, and detects mismatch,
wherein the first bridge circuit transmits the output signal among the first body-side asynchronous transfer control signals as the output signal among the asynchronous transfer control signals, to the second bridge circuit, and
wherein the second bridge circuit receives the payload signal, at a timing indicated by the input signal, among the asynchronous transfer control signals which are received from the first bridge circuit, and provides the payload signal to the second circuit.

13. A data processing device comprising:
a first body circuit and a first check circuit which operate in synchronization with a first clock, and are duplicated to each other so as to respectively perform the same processing;
a second circuit which operates in synchronization with a second clock which is asynchronous to the first clock; and
an asynchronous transfer circuit that performs asynchronous transfer of a payload signal between the first body circuit and the first check circuit, and the second circuit,
wherein the asynchronous transfer circuit includes a first bridge circuit which operates in synchronization with the first clock and is connected to the first body circuit and the first check circuit, and a second bridge circuit which operates in synchronization with the second clock and is connected to the second circuit, and the first bridge circuit and the second bridge circuit are connected with each other through the payload signal and an asynchronous transfer control signal indicating a timing at which the payload signal is stable on the reception side,
wherein the first bridge circuit includes a first body-side conversion circuit that converts input and output signals to and from the first body circuit into a first body-side payload signal and first body-side asynchronous transfer control signals, a first check-side conversion circuit that converts input and output signals to and from the first check circuit into a first check-side payload signal and first check-side asynchronous transfer control signals, and a second comparison circuit that compares an output signal to be transmitted to the second bridge circuit among the first body-side asynchronous transfer control signals and the corresponding output signal among the first check-side asynchronous transfer control signals, and detects mismatch, and
wherein the first bridge circuit receives the payload signal, at a timing indicated by the input signal, among the asynchronous transfer control signals which are transferred from the second bridge circuit, and provides the payload signal to the first body circuit through the first body-side conversion circuit, and to the first check circuit through the first check-side conversion circuit, respectively.

14. The data processing device according to claim 12,
wherein the second circuit includes a second body circuit and a second check circuit which operate in synchronization with the second clock, and are duplicated to each other so as to respectively perform the same processing,
wherein the second bridge circuit includes a second body-side conversion circuit that converts input and output signals to and from the second body circuit into a second body-side payload signal and a second body-side asynchronous transfer control signal, and a second check-side conversion circuit that converts input and output signals to and from the second check circuit into a second check-side payload signal and second check-side asynchronous transfer control signals, and
wherein the second bridge circuit receives the payload signal, at a timing indicated by the input signal, among the asynchronous transfer control signals which are received from the first bridge circuit, and provides the payload signal to the second body circuit through the second body-side conversion circuit, and to the second check circuit through the second check-side conversion circuit, respectively.

15. The data processing device according to claim 12,
wherein the second circuit includes a second body circuit and a second check circuit which operate in synchronization with the second clock, and are duplicated to each other so as to respectively perform the same processing,
wherein the second bridge circuit includes a second body-side conversion circuit that converts input and output signals to and from the second body circuit into a second body-side payload signal and a second body-side asynchronous transfer control signal, and a second check-side conversion circuit that converts input and output signals to and from the second check circuit into a second check-side payload signal and second check-side asynchronous transfer control signals, wherein the first bridge circuit transmits the check payload signal in addition to the payload signal, and wherein in the second bridge circuit, the second body-side conversion circuit receives the payload signal, at a timing indicated by the input signal, among the asynchronous transfer control signals which are received from the first bridge circuit, and the second check-side conversion circuit also receives the payload signal, at a timing indicated by the input signal, among the asynchronous transfer control signals which are received from the first bridge circuit.

16. The data processing device according to claim 12, wherein the second circuit includes a second body circuit and a second check circuit which operate in synchronization with the second clock, and are duplicated to each other so as to respectively perform the same processing, wherein the second bridge circuit includes a second body-side conversion circuit that converts input and output signals to and from the second body circuit into a second body-side payload signal and a second body-side asynchronous transfer control signal, and a second check-side conversion circuit that converts input and output signals to and from the second check circuit into a second check-side payload signal and second check-side asynchronous transfer control signals, wherein the first bridge circuit transmits the output signal among the first body-side asynchronous transfer control signals as the output signal among the asynchronous transfer control signals, to the second bridge circuit, transmits the first body-side payload signal as the payload signal to the second bridge circuit, transmits the output signal among the first check-side asynchronous transfer control signals as the check asynchronous transfer control signal, to the second bridge circuit, and transmits the second check-side payload signal as the check payload signal to the second bridge circuit, wherein the second bridge circuit receives the payload signal so as to supply the payload signal as the second body-side payload signal to the second body-side conversion circuit, and receives the check payload signal so as to supply the check payload signal as the second check-side payload signal to the second check-side conversion circuit, at a timing indicated by the input signal among asynchronous transfer control signals, and wherein the second bridge circuit includes a third comparison circuit that compares an input signal among the asynchronous transfer control signals and an input signal among the check asynchronous transfer control signals.

17. The data processing device according to claim 16, wherein the third comparison circuit compares a signal of a node at which an input signal among the asynchronous transfer control signals is supplied to the first body-side conversion circuit, a signal of a node which is supplied to the second check-side conversion circuit, and an input signal among the check asynchronous transfer control signals, and detects that at least one signal does not match the other signals.

18. The data processing device according to claim 12, wherein the first body circuit and the first check circuit perform the same processing with a difference of a predetermined number of cycles of 0 or more cycles from the first clock.

19. The data processing device according to claim 12, further comprising: an error management circuit which is notified of the occurrence of mismatch in any of all of the comparison circuits.

20. The data processing device according to claim 12, wherein the data processing device is formed on a single semiconductor substrate.

* * * * *